(12) United States Patent
Perez et al.

(10) Patent No.: US 8,429,203 B2
(45) Date of Patent: Apr. 23, 2013

(54) UI DRIVEN SERVICE COMPOSITION TOOL WITH UI DESIGNER FEEDBACK

(75) Inventors: Ido Perez, Lehavim (IL); Maya Amit, Tel Aviv (IL); Michal Zmiri-Yaniv, Ramat Hasharon (IL)

(73) Assignee: SAP AG, Walldorf (DE)

( * ) Notice: Subject to any disclaimer, the term of this patent is extended or adjusted under 35 U.S.C. 154(b) by 130 days.

(21) Appl. No.: 12/860,651

(22) Filed: Aug. 20, 2010

(65) Prior Publication Data

US 2012/0047130 A1 Feb. 23, 2012

(51) Int. Cl.
G06F 7/00 (2006.01)
G06F 17/30 (2006.01)

(52) U.S. Cl.
USPC .......................................................... 707/804

(58) Field of Classification Search .................. 707/601, 707/804, 634, 805, 999.102
See application file for complete search history.

(56) References Cited

U.S. PATENT DOCUMENTS

| | | | |
|---|---|---|---|
| 2004/0177335 A1 | 9/2004 | Beisiegel et al. | |
| 2004/0210552 A1* | 10/2004 | Friedman et al. | 707/1 |
| 2005/0097224 A1 | 5/2005 | Chen et al. | |
| 2006/0236306 A1 | 10/2006 | Debruin et al. | |
| 2006/0271644 A1* | 11/2006 | Yamaizumi et al. | 709/218 |
| 2007/0088815 A1 | 4/2007 | Ma et al. | |
| 2008/0120563 A1 | 5/2008 | Tang et al. | |
| 2008/0127052 A1 | 5/2008 | Rostoker | |
| 2008/0189628 A1* | 8/2008 | Liesche et al. | 715/762 |
| 2008/0229275 A1 | 9/2008 | Weber | |
| 2008/0244518 A1 | 10/2008 | Kozempel et al. | |
| 2008/0250071 A1 | 10/2008 | Norring et al. | |
| 2010/0241978 A1* | 9/2010 | Genovese et al. | 715/765 |

OTHER PUBLICATIONS

Extended European Search Report issued in European Application No. 11006657.8 on Sep. 30, 2011; 6 pages.
"SAP NetWeaver Visual Composer: User Guide," SAP NetWeaver Visual Composer release 6.0, Document version 1.1, Jul. 9, 2004, pp. 1-103.
"SAP NetWeaver Visual Composer: User Guide," SAP NetWeaver Visual Composer release 6.0, Document version 1.1, Jul. 9, 2004, pp. 104-208.
"Resource Description Framework," Wikipedia, [online], <http://en.wikipedia.org/wiki/Resource_Description_Framework>, retrieved Aug. 20, 2010, pp. 1-9.
"Integrated development environment," Wikipedia, [online], <http://en.wikipedia.org/wiki/Integrated_development_environment>, retrieved Aug. 20, 2010, pp. 1-4.

(Continued)

Primary Examiner — Alexey Shmatov
(74) Attorney, Agent, or Firm — Fish & Richardson P.C.

(57) ABSTRACT

The present disclosure involves systems, software, and computer implemented methods for automatically selecting at least one service for use with a modeled user interface (UI). One process includes operations for identifying a modeled UI at design time in an integrated development environment (IDE) and collecting a set of information associated with the modeled UI. At least one service repository storing a set of services is searched based at least in part on the collected set of information associated with the modeled UI. At least a portion of the set of services is presented via a graphical user interface associated with the IDE. A selection of at least one of the presented set of services is received, and an augmented version of the modeled UI is generated based on the received selection.

22 Claims, 7 Drawing Sheets

OTHER PUBLICATIONS

Mohan, Rahul et al.; "Model Driven Development of Graphical User Interfaces for Enterprise Business Applications and Experience, Lessons Learnt and a Way Forward"; Model Driven Engineering Languages and Systems; Oct. 4, 2009; pp. 307-321.

Extended European Search Report issued in European Application No. 11005771.8 on Nov. 2, 2011; 8 pages.

"A Social Based Mechanism to Use Services in the Web through Keyword Search"; IP.com; Jun. 8, 2010; pp. 1-6.

Xu; "Reputation-Enhanced Web Services Discovery with QoS"; Queen's University; Aug. 2006; pp. 1-91.

Office Action issued in U.S. Appl. No. 12/860,643 on Aug. 30, 2012; 26 pages.

Liu et al., "A User-Oriented Approach to Automated Service Composition", 2008 IEEE International Conference on Web Services, p. 773-776.

Office Action issued in U.S. Appl. No. 12/860,643 on Dec. 17, 2012;__pages.

* cited by examiner

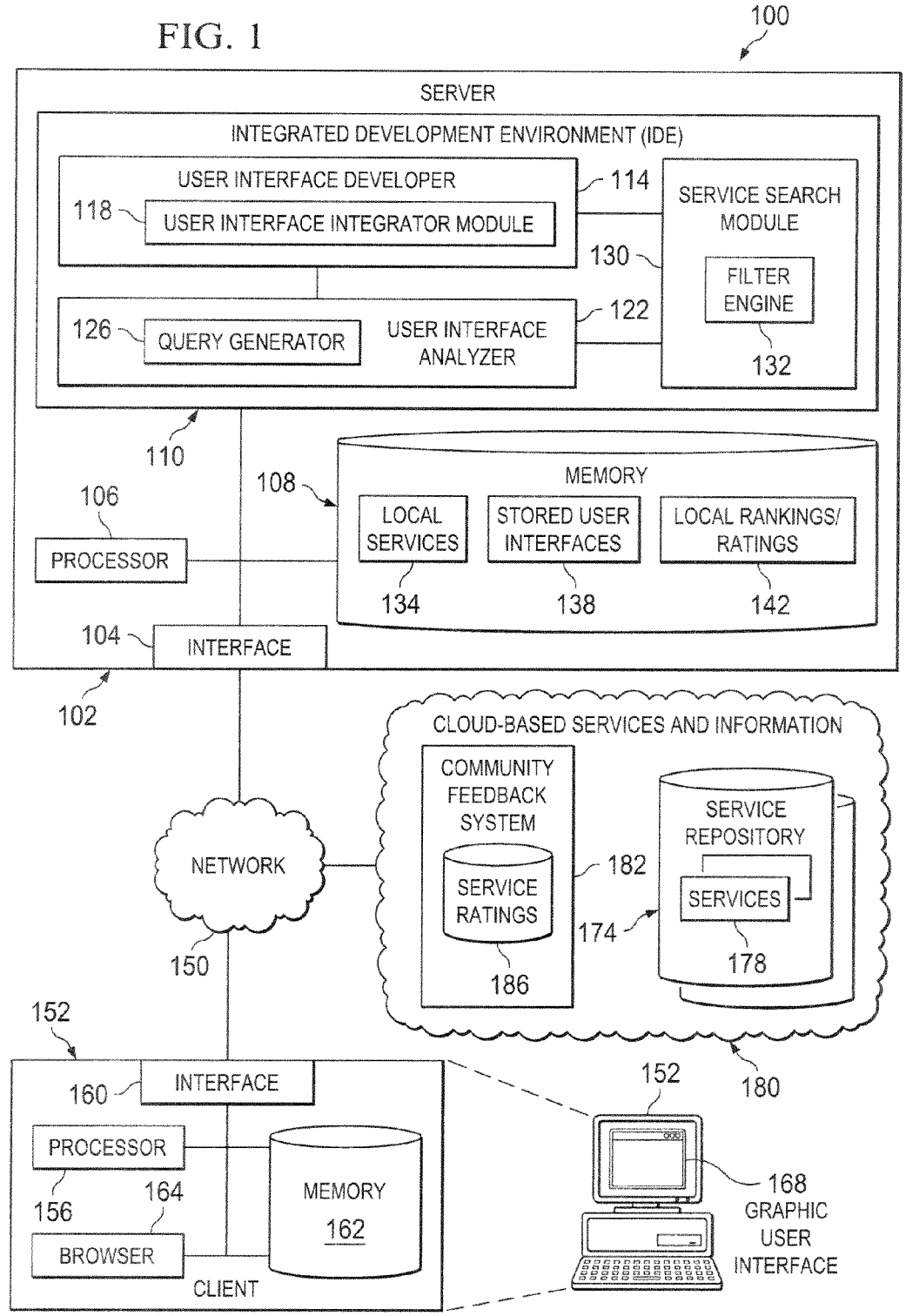

UI DRIVEN SERVICE COMPOSITION TOOL WITH UI DESIGNER FEEDBACK

TECHNICAL FIELD

The present disclosure relates to software, computer systems, and computer implemented methods for automatically selecting at least one service for use with a modeled user interface (UI).

BACKGROUND

Application developers and programmers use various tools, systems, and methods to generate applications, programs, and interfaces. Generally, applications are developed in one of a plurality of development technology platforms, including MICROSOFT's® .NET, Sun System's JAVA™, or other suitable programming languages and development environments. Additionally, the user interfaces (UIs) associated with applications may be modeled, created, or modified using a particular technology or tool. In some instances, applications may be developed in an integrated development environment (IDE). IDEs are designed to maximize programmer and developer productivity by providing connections between software components and UIs. Some IDEs are associated with a specific programming language, so as to provide a feature set which more closely matches the programming requirements, syntax, and operations of the specific programming language, while other IDEs may be used with multiple programming languages.

Service-oriented applications allow developers to re-use business logic and portions of applications written by the developers themselves, as well as business logic written by others. The reusable business logic can be represented and exposed as a web service, and may be stored local to or remote from the present developer. Some web services may be available at a remotely located server or system, as well as at cloud-based systems storing or exposing services. Generally, services are identified that perform one or more operations or functions associated with the application being developed. These services can be found in service directories, such as a universal description discovery and integration (UDDI) registry containing one or more web services described in Web Services Description Language (WSDL) documents providing information regarding each of the web services stored in or referenced by the registry. Alternatively, services may be found through developer networks associated with a particular business or entity, or through services provided by or created by a community network of developers working on similar platforms and solutions.

Services are generally identified outside of the developer's IDE and are not integrated into the development process. In general, the search may be based on the service name, inputs, outputs, or description of the desired service. Once a service satisfying the developer's or application's needs is identified, the service can then be connected (or bound) to an application UI that will be used in connection with the service itself. In most instances, the identified service will not match exactly to the UI. For example, the service may require more, less, or different inputs and outputs than provided by the corresponding UI. Additionally, the UI may have similar names or labels as the inputs or outputs associated with the identified service, although in actuality, different information is represented.

SUMMARY

The present disclosure involves systems, software, and computer implemented methods for automatically selecting at least one service for use with a modeled user interface (UI). One process includes operations for identifying a modeled UI at design time in an integrated development environment (IDE) and collecting a set of information associated with the modeled UI. At least one service repository storing a set of services is searched based at least in part on the collected set of information associated with the modeled UI. At least a portion of the set of services is presented via a graphical user interface associated with the IDE. A selection of at least one of the presented set of services is received, and an augmented version of the modeled UI is generated based on the received selection.

While generally described as computer implemented software embodied on tangible media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 1 illustrates an example environment implementing various features of a service composition tool for automatically selecting at least one service for use with a modeled user interface (UI).

DETAILED DESCRIPTION

Figure 2A:
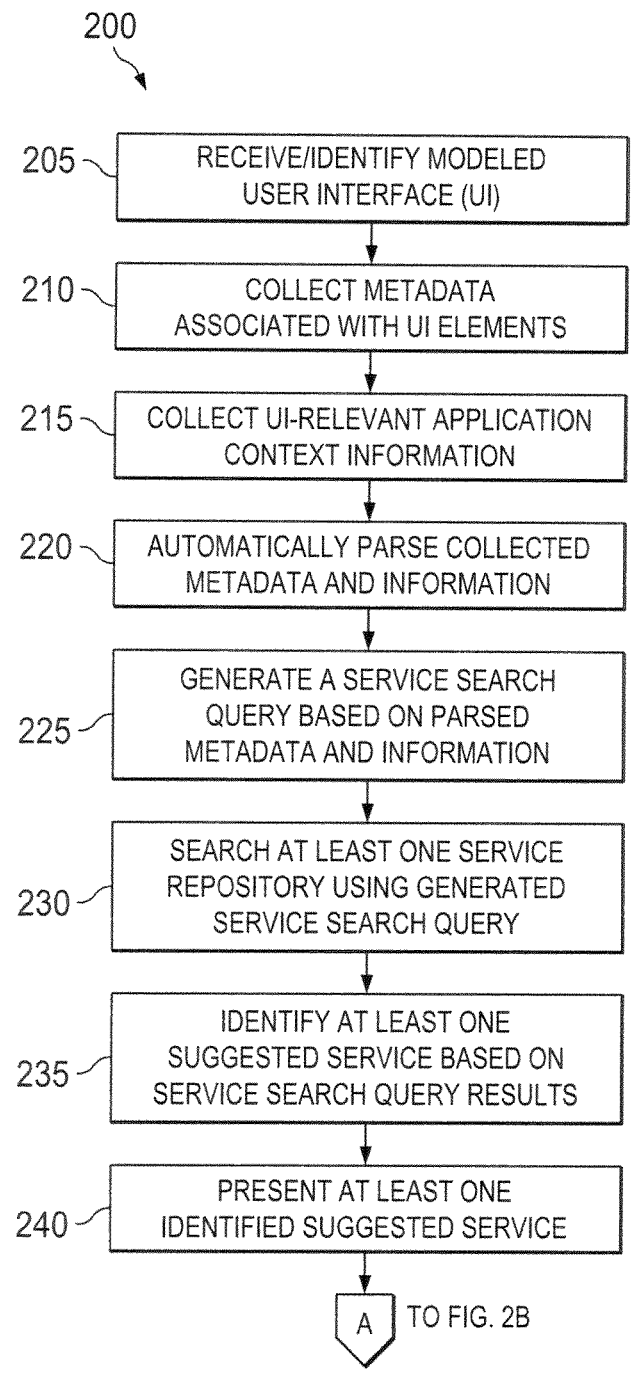
FIG. 2 is a flowchart of an example process for automatically selecting at least one service for use with a modeled UI using a suitable system, such as the system described in FIG. 1, as illustrated from the perspective of an integrated development environment (IDE).

This disclosure generally describes computer systems, software, and computer implemented methods for providing a service composition tool for automatically selecting at least one service for use with a modeled user interface (UI). The present disclosure describes a system for collecting and analyzing metadata associated with the modeled UI in an integrated development environment (IDE), metadata or other information associated with the application context of the associated IDE (or any other appropriate development environment or platform), and using at least that metadata to generate a query for at least one service or combination of services (a "service composition") corresponding to the inputs, outputs, and context of the modeled UI. Once a suitable query is generated, at least one service repository may be searched using the generated query to identify a service or service composition corresponding to, and providing the inputs and outputs associated with, the modeled UI. In some instances, a plurality of possible services and service compositions may be identified by the search, with the possible services and service compositions ranked according to one or more ratings or specified criteria. When one of the identified services or service compositions is selected, one or more modifications to the UI may be suggested to the user in order for the UI to better reflect the inputs and outputs associated with the selected service or service composition. When multiple services or service compositions are returned by the search, selecting different services or service compositions can provide illustrations of the various modifications that may be suggested when a particular service or service composition is selected. When a particular service or service composition is selected and finalized, the modeled UI may be automatically modified as required and/or suggested based on the final service or service composition selection by the IDE, an IDE plug-in, or another module or application capable of manipulating the modeled UI. In some instances, a user may select one or more of the suggested modifications to the modeled UI based on the suggestions presented by the service composition tool. Once the modeled UI has been modified, including any additional modifications outside of those required or suggested by the system, the newly added services and/or service compositions may be connected, or bound, to the UI, thus generating the program code incorporating the services and service compositions into the corresponding UI.

One potential benefit of the present disclosure is the suggestion and association of services and service compositions based on a modeled UI. By allowing developers to focus on the visual design of the application or tool, the present disclosure provides technical developers, UI designers, and general business users with the ability to create detailed UIs, while at the same time the ability to automatically locate the most relevant corresponding services and service compositions that can perform and/or provide the inputs and outputs associated with the application's UI. In some instances, UI designers can use the tool described herein to design a modeled UI to be associated with a particular task or operation, and using this tool, bind that UI to the underlying business logic (or services) for performing that particular task or operation without the need for a technical developer. In some instances, the present disclosure provides a system and method for locating the appropriate services, which does not require any active searching by the developer or user. Further, the present disclosure may, in some instances, provide a feedback mechanism that can allow a developer or user to benefit from feedback, ratings, and comments from a community of developers generating similar applications and UIs, such that the feedback can be used to rank and select particular services and service compositions when more than one set of search results is returned. Still further, the feedback mechanism can incorporate specific, user-based criteria in its searching, filtering, and ranking algorithms to provide user-specific results when taken in combination with the information collected from the UI and the application context.

Still further, the present disclosure can provide a tool or plug-in embedded within or inherently associated with an IDE of the developer or user's preference, limiting the learning curve required to apply the techniques described herein. For example, the developer or user, who may be more comfortable designing UIs and applications in a particular underlying technology, may use the present disclosure to design the application in that specific technology, while being able to select services and service compositions from any compatible set of services associated with the corresponding IDE. Further, by automating the service search operations, the present disclosure removes the need for the developer or user to search a particular local or remote location or repository for corresponding services. Developers and users may no longer need to look up services in a repository, directory, or search engine, and instead can focus primarily (and in some cases, solely) on the development of the modeled UI. Still further, in some instances, the modeled UI may not match the inputs and outputs of the identified services exactly. In some implementations, the present disclosure can provide suggestions and modifications to the UI in an easy to understand illustration on or an augmented version of the modeled UI, as well as allowing for immediate and simple UI modifications to better implement the selected services.

FIG. 1 illustrates an example environment 100 implementing various features of a service composition tool for automatically selecting at least one service for use with a modeled UI. The illustrated environment 100 includes, or is communicably coupled with, a development server 102, one or more clients 152, and a set of cloud-based services and information 180, at least some of which communicate across or via network 150. In general, environment 100 depicts an example configuration of a system capable of automatically selecting at least one service for use with a modeled UI, and in some instances, integrating the at least one selected service into the modeled UI and its underlying or associated program code. The environment 100 also supports one or more additional servers operable to provide concurrent or similar functionality as provided by server 102, as well as a plurality of clients 152 associated with one or more servers 102. Further, the set of cloud-based services and information 180 is represented in FIG. 1 as elements within a cloud computing network, from which both the client 152 and server 102 may access information. In alternative implementations, the elements illustrated within the set of cloud-based services and information 180 may instead be associated with specific servers, clients, or other locations, as opposed to the general cloud computer network illustrated herein.

In general, server 102 is any server that stores and executes an integrated development environment (IDE) application 110 used by developers and other users to create and develop applications and their associated UIs, where, in some instances, the IDE 110 may be used to automatically identify at least one service to be integrated or used with a modeled UI. For example, server 102 may be a JAVA™ 2 Platform, Enterprise Edition (J2EE®)-compliant application server that includes JAVA™ technologies such as ENTERPRISE JAVA-BEANS® (EJB), J2EE® Connector Architecture (JCA), JAVA™ Messaging Service (JMS), JAVA™ Naming and Directory Interface (JNDI), and JAVA™ Database Connectivity (JDBC). In some instances, the server 102 may store a plurality of various other applications, while in other instances, the server 102 may be a dedicated server meant to store and execute only the IDE 110 and its related functionality. In some instances, the server 102 may comprise a web server or be communicably coupled with a web server, where the IDE 110 represents one or more web-based development applications accessed and executed via network 150 by the clients 152 of the system to perform the programmed tasks or operations of the IDE 110.

At a high level, the server 102 comprises an electronic computing device operable to receive, transmit, process, store, or manage data and information associated with the environment 100. The server 102 illustrated in FIG. 1 can be responsible for receiving application requests from one or more client applications or browsers 164, as well as business applications associated with the clients 152 of environment 100 and specifically designed to interact with the IDE 110, responding to the received requests by processing said requests in the associated IDE 110, and sending the appropriate responses from the IDE 110 back to the requesting client application or browser 164. Alternatively, the IDE 110 at server 102 can be capable of processing and responding to local requests from a user accessing server 102 locally. Accordingly, in addition to requests from the external clients 152 illustrated in FIG. 1, requests associated with the IDE 110 may also be sent from internal users, external or third-party customers, other automated applications, as well as any other appropriate entities, individuals, systems, or computers. Further, the terms "client application" and "business application" may be used interchangeably as appropriate without departing from the scope of this disclosure. Additionally, a web browser, including a web browser associated with a mobile device, may in some instances be used as a web-based client application, and thus used interchangeably therewith.

As used in the present disclosure, the term "computer" is intended to encompass any suitable processing device. For example, although FIG. 1 illustrates a single server 102, environment 100 can be implemented using two or more servers 102, as well as computers other than servers, including a server pool. Indeed, server 102 may be any computer or processing device such as, for example, a blade server, general-purpose personal computer (PC), MACINTOSH®, workstation, UNIX-based workstation, or any other suitable device. In other words, the present disclosure contemplates computers other than general purpose computers, as well as computers without conventional operating systems. Further, illustrated server 102 may be adapted to execute any operating system, including Linux, UNIX, Windows, Mac OS®, or any other suitable operating system. According to one implementation, server 102 may also include or be communicably coupled with a mail server.

In the illustrated implementation, and as shown in FIG. 1, the server 102 includes a processor 106, an interface 104, a memory 108, and an IDE 110. The interface 104 is used by the server 102 to communicate with other systems in a client-server or other distributed environment (including within environment 100) connected to the network 150 (e.g., client 152, as well as other systems communicably coupled to the network 150). FIG. 1 depicts both a server-client environment, as well as a cloud computing network. Various other implementations of the illustrated environment 100 can be provided to allow for application and UI development and access to the IDE 110 and its associated functionality, including by accessing the server 102 as a node or location within a cloud computing network. Alternatively, the IDE 110 may be provided or accessed locally at a computer. Generally, the interface 104 comprises logic encoded in software and/or hardware in a suitable combination and operable to communicate with the network 150. More specifically, the interface 104 may comprise software supporting one or more communication protocols associated with communications such that the network 150 or interface's hardware is operable to communicate physical signals within and outside of the illustrated environment 100.

Although not illustrated in FIG. 1, in some implementations the server 102 may also include a user interface, such as a graphical user interface (GUI). The server's GUI may comprise a graphical user interface operable to, for example, allow the user of the server 102 to interface with at least a portion of the platform for any suitable purpose, such as creating, preparing, requesting, or analyzing data, as well as viewing and accessing source documents associated with business transactions and applications or application UIs under development. Generally, the GUI provides the particular user with an efficient and user-friendly presentation of business data provided by or communicated within the system. The GUI may comprise a plurality of customizable frames or views having interactive fields, pull-down lists, buttons, and other controls operated by the user. For example, the GUI may provide interactive elements that allow a user to enter, remove, modify, or select elements of an under-development application in the GUI. More generally, the GUI may also provide general interactive elements that allow a user to access and utilize various services and functions of IDE 110. Therefore, the server's GUI contemplates any suitable graphical user interface, such as a combination of a generic web browser, an IDE-specific GUI, and command line interface (CLI) that processes information in the platform and efficiently presents the results to the user visually.

Generally, example server 102 may be communicably coupled with a network 150 that facilitates wireless or wireline communications between the components of the environment 100 (i.e., between the server 102 and client 152 as well as between server 102 and the set of cloud-based services and information 180), as well as with any other local or remote computer, such as additional clients, servers, or other devices communicably coupled to network 150, including those not illustrated in FIG. 1. In the illustrated environment, the network 150 is depicted as a single network in FIG. 1, but may be comprised of more than one network without departing from the scope of this disclosure, so long as at least a portion of the network 150 may facilitate communications between senders and recipients. The network 150 may be all or a portion of an enterprise or secured network, while in another instance, at least a portion of the network 150 may represent a connection to the Internet. In some instances, a portion of the network 150 may be a virtual private network (VPN), such as, for example, the connection between the client 152 and the server 102. Further, all or a portion of the network 150 can comprise either a wireline or wireless link. Example wireless links may include 802.11a/b/g/n, 802.20, WiMax, and/or any other appropriate wireless link. In other words, the network 150 encompasses any internal or external network, networks, sub-network, or combination thereof operable to facilitate communications between various computing components inside and outside the illustrated environment 100. The network 150 may communicate, for example, Internet Protocol (IP) packets, Frame Relay frames, Asynchronous Transfer Mode (ATM) cells, voice, video, data, and other suitable information between network addresses. The network 150 may also include one or more local area networks (LANs), radio access networks (RANs), metropolitan area networks (MANs), wide area networks (WANs), all or a portion of the Internet, and/or any other communication system or systems at one or more locations. The network 150, however, is not a required component in all implementations of the present disclosure.

As illustrated in FIG. 1, server 102 includes a processor 106. Although illustrated as a single processor 106 in FIG. 1, two or more processors may be used according to particular needs, desires, or particular embodiments of environment 100. Each processor 106 may be a central processing unit (CPU), a blade, an application specific integrated circuit (ASIC), a field-programmable gate array (FPGA), or another suitable component. Generally, the processor 106 executes instructions and manipulates data to perform the operations of server 102 and, specifically, the functionality associated with the IDE 110. In one implementation, the server's processor 106 executes the functionality required to receive and respond to requests and instructions from the client 152 and their respective browser or client applications 164, as well as the functionality required to perform the other operations of the IDE 110.

Regardless of the particular implementation, "software" may include computer-readable instructions, firmware, wired or programmed hardware, or any combination thereof on a tangible medium operable when executed to perform at least the processes and operations described herein. Indeed, each software component may be fully or partially written or described in any appropriate computer language including C, C++, JAVA™, Visual Basic, assembler, PERL®, any suitable version of 4GL, as well as others. It will be understood that while portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate. In the illustrated environment 100, processor 106 executes the IDE 110 on the server 102.

At a high level, the IDE 110 is any application, program, module, process, or other software that may execute, change, delete, generate, or otherwise manage information associated with developing applications and UIs according to the present disclosure, particularly in response to and in connection with one or more requests received from the illustrated client 152 and their associated browser and/or client application 164. In certain cases, only one IDE 110 may be located at a particular server 102. In others, a plurality of related and/or unrelated IDEs 110 may be stored at a single server 102, or located across a plurality of other servers 102 (not illustrated in FIG. 1), as well. Additionally, the IDE 110 may represent web-based applications accessed and executed by remote clients 152 or browsers 164 via the network 150 (e.g., through the Internet). Further, while illustrated as internal to server 102, one or more processes associated with a particular IDE 110 may be stored, referenced, or executed remotely. For example, a portion of a particular IDE 110 may be a web service associated with the IDE 110 that is remotely called, while another portion of the IDE 110 may be an interface object or agent bundled for processing at a remote client 152. Moreover, any or all of the IDE 110 may be a child or sub-module of another software module or enterprise application (not illustrated) without departing from the scope of this disclosure. Still further, portions of the IDE 110 may be executed or accessed by a user working directly at server 102, as well as remotely at client 152.

As illustrated in FIG. 1, the IDE 110 may be a software application that provides tools and operations to computer programmers, application developers, and business users for use in software development. Example IDEs include Eclipse, MICROSOFT's Visual Studio, and SAP's Netweaver, among others. In some instances, the IDE 110 may include a source code editor, a compiler and/or an interpreter, a debugger, and various other tools for developing UIs and other applications. In some instances, the IDE 110 may be associated with a specific programming technology (e.g., JAVA™), while in other instances, the IDE 110 may be capable of interacting and creating applications and UIs using two or more programming technologies. As specifically illustrated in FIG. 1, the IDE 110 may include a UI developer module 114, a UI analyzer module 122, and a service search module 130. Although only these three modules are illustrated within the IDE 110 in FIG. 1, the IDE 110 may be combined with or include any number of additional modules and components for performing various types of additional operations within the IDE 110. Further, some or all of the illustrated components may be embedded within or included as part of the underlying functionality of the IDE 110, and may not be a specific component within the IDE 110 in some instances. Additionally, two or more of the illustrated components may be combined into a single module or embedded element of the IDE 110. Further, in some implementations, some or all of the operations associated with the various illustrated modules may be, at least in part, executed or performed external to the IDE 110, and in some instances, the server 102 itself. In other implementations, only a portion of the functionality may be performed by the system, while in others, different or additional functionality may be included. In some instances, each module may be a plug-in added to an underlying software application containing the specific functionality as needed by the developer or business user, or provided by the associated information technology administrator.

The UI developer module 114 allows developers and business users to create UIs of varying complexity in the IDE 110, such as through the provision of various tool bars, UI elements, and other design tools used to generate and visualize UIs. The UI developer module 114 of the IDE 110 may be used to create various types of UIs, including a simple form with specified inputs and outputs, as well as a detailed and complex set of UIs associated with various business processes and user interactions. In some instances, the level of UI complexity may depend solely on the abilities of the developer or business user. Generally, however, the UI developer module 114 provides a selection of tools and methods for easily generating a UI representing various inputs to be provided by a user or a process, as well as a set of outputs to be presented in the UI based on the provided inputs. In some instances, the outputs associated with a UI may be presented in a second UI associated with the first, such that a series of UIs are generated by the developer. The UI developer module 114 and the IDE 110 may provide additional tools for generating a series of UIs for performing the various transitions and operations associated with a particular application.

As illustrated in FIG. 1, the UI developer module 114 includes a UI integrator module 118. The UI integrator module 118 can be used with the other portions and modules of the IDE 110 to integrate one or more services and/or service compositions into a particular UI's visualization, as well as into application or program code associated with that UI. As described above, and as will be described in further detail below, the UI integrator module 118 performs the functionality associated with actually integrating the selection of one or more services and/or service compositions into a modeled UI, where the one or more services and/or service compositions have been suggested based on web (and other) service queries executed based on the components of the UI, as well as the UI's application context. Once one or more services and/or service compositions are selected to be the back-end functionality of a particular UI or UI element, the UI integrator module 118 performs the various operations for adding the service and/or service composition to the programming code associated with the UI. In some instances, integrating the services and/or service compositions with the UI may include adding or removing one or more UI elements (e.g., particular inputs and/or outputs) according to the requirements or suggestions of the IDE 110. Further, the UI integrator module 118 may also provide functionality allowing developers and users to view the potential effects of integrating one or more services and/or service compositions prior to actually integrating the corresponding service or service composition into the modeled UI. This functionality is described in additional detail below.

The IDE 110 also includes a UI analyzer module 122. The UI analyzer module 122 is used during design time to analyze the UI elements and components provided by a developer and/or business user in order to determine a set of suggested services and/or service compositions to be associated with and integrated into the designed UI. As illustrated in FIG. 1, the UI analyzer module 122 analyzes a modeled UI to identify various elements associated therewith, including the input and output elements of the UI. Input elements may include, among others, text boxes, drop-down lists, combo boxes, radio buttons, check boxes, sliders, command buttons, and spinners. Outputs elements may include text boxes, grid views, tables, and others. Generally, the input and output elements of the UI may be associated with a particular label, such as "CustomerID," "SalesPersonID," or other similar labels. Each input and output element included in a UI may have a specific label that defines (in some cases, semantically) the input or output associated with the UI element. The particular inputs and outputs of the modeled UI can be explicitly defined by the developer/user, or, alternatively, provided default values by the UI developer module 114, when the UI elements are added to the modeled UI. The UI analyzer module 122 can analyze modeled UIs to determine the set of inputs and outputs associated with a particular UI. In some instances, the eXtensible Markup Language (XML) associated with a UI may be used by the UI analyzer module 122 to parse the information included in a particular UI. The UI information collected by the UI analyzer module 122 may include or be UI metadata defining one or more UI characteristics, including metadata associated with the inputs and outputs defined in the modeled UI. In some instances, the metadata collected from the modeled UI may not use identical terms as those included in the various services. For example, while an input element may be associated with a label of "Client," one or more service inputs may be entitled "Customer." In those instances, the UI analyzer module 122 may identify or have incorporated an ontology map between similar terms, allowing the UI analyzer module 122 (or any other suitable portion of the environment 100) to identify similar terms. The ontology map may be a fluid mapping of terms, and in some instances, the relationships between terms may be defined at least in part based on information received from one or more developers within a community of developers to associated terms. Based on actions, either explicit (e.g., a direct link between a term and a service input) or implicit (e.g., usage of a service with two or more differently-named UI elements), performed by community members and developers, the ontology can be dynamically updated.

In addition to particular UI metadata, the UI analyzer module 122 can also analyze an application context associated with a particular modeled UI to determine additional information associated with the UI. The UI analyzer module 122 may collect a set of information associated with a particular modeled UI to generate or determine an application context associated with that UI. For example, the UI may be associated with a particular application. Information associated with that particular application (that is associated with the corresponding UI) may be used to generate additional information associated with the UI, including the name of the associated application, an application type, an industry or area associated with the application, as well as other components or UIs previously or currently associated with the application. In other words, various sets of information can be used to collect an application context associated with the particular UI. The application context may also include information associated with the users or developers associated with the particular UI, such as the user currently accessing or working with the UI, as well as other collaborators and/or persons associated with the development of the UI.

As illustrated, the UI analyzer module 122 includes a query generator module 126. The query generator module 126 can parse the UI metadata and the application context information, and use the collected information to generate at least one search query to be executed against one or more service repositories or directories within or external to the illustrated environment 100. The queries generated may be in any suitable format, including a structured query language (SQL). In one example, the query may be generated for execution against a resource description framework (RDF) database. An RDF database uses an RDF data model to describe, represent, and map resources, such as hypertext markup language (HTML) documents, web service description language (WSDL) documents, XML documents, and uniform resource identifiers (URI), among others, with statements in the form of subject-predicate-object expressions (also known as "triples" in RDF terminology). The RDF data model provides a semantic description of resources, services, and other information stored within the RDF database. For example, a WSDL directory or database could have a terminology that describes what a web service does as well as what inputs and outputs it has. Several example triples may include:

ServiceA [subject] is a [predicate] WebService [object];
ServiceA [subject] has an [predicate] InputMessage [object];
InputX [subject] is a [predicate] InputMessage [object].

The RDF database includes various triples such as those described above, and may use a resource mapper to generate a graph database, in which the triples describing a particular resource are connected to each other. The mapping of various resources can be performed offline or at runtime.

Where a database associated with the query generator module 126 is an RDF database, the query generator module 126 can generate at least one of its queries in an RDF-compliant query language, such as SPARQL. The query generator module 126 may itself generate the SPARQL query, while in other instances, the query generator module 126 may pass a set of query parameters developed by the query generator module 126 to a SPARQL web service or other query conversion engine to translate the set of query parameters into an RDF-compliant SPARQL query. The SPARQL query may then be provided to the service search module 130 in order to execute the query against the RDF database.

In addition to RDF databases storing service information, one or more additional non-RDF databases, repositories, or directories may also be searched by the components of the IDE 110 for services best matching the current UI. The RDF databases and non-RDF databases, repositories, and directories may be local to server 102, such as the set or repository of local services 134 within memory 108, as well as remote from server 102, such as the service repository 174 located in the set of cloud-based services and information 180 and accessible by the server 102 via network 150. The non-RDF directories may include a web service metadata index, the web service metadata index comprising any file, database, or other repository that includes parameters, pointers, variables, instructions, rules, links, or other data for providing information associated with available web services. For example, a metadata index may be a UDDI-based or other enterprise registry that contains or references definitions of web services and associations to their metadata. In some embodiments, metadata indices may be formatted, stored, or defined as various data structures in XML documents, text files, Virtual Storage Access Method (VSAM) files, flat files, Btrieve files, comma-separated value (CSV) files, internal variables, one or more libraries, or any other format capable of storing or presenting web services and their respective web methods in an efficient or user friendly manner. In some instances, the web services themselves may be stored with or local to the web service metadata index, while in other instances, the web service metadata index may provide external links to the web services referenced in the registry. In still other instances, some web services may be local to the metadata index, while some web services may be external to or remote from the metadata index. The web service metadata index can generally provide information associated with and the location of the particular web service.

In some instances, the query generator module 126 may specify a particular repository or location associated with the generated queries. In other instances, the query generator module 126 may generate generic queries that can be used with any number of web service repositories, as well as queries that can be used with one or more different types of repositories or directories. In some instances, the query generator module 126 can generate multiple queries for a single UI, allowing a plurality of repositories to be searched for matching services and services compositions. Further, queries may be generated to specify the type of UI elements included in the modeled UI so that services corresponding to the UI element type (e.g., lists, combo boxes, tree diagrams, etc.) associated with the UI can be returned. In some instances, some services may be capable of being bound to a particular UI element type, but not to others. In some instances, the compatible UI element type may be a required parameter defined in the generated query, while in others, the compatible UI element type may be used to sort or filter the services returned after the generated query is executed.

After queries for a particular UI are generated by the query generator module 126, those queries are provided to the service search module 130 of the IDE 110. The service search module 130 may comprise a service-related search engine, and can use the generated queries to identify one or more services that best satisfy the UI metadata and application context collected from the modeled UI by the UI analyzer 122. In some instances, the service search module 130 may be specifically associated with one or more service repositories, registries, directories, or databases (including an RDF database). Additionally, the service search module 130 may also, or alternatively, search a plurality of locations storing, referencing, or that are associated with web services, so that an execution of the generated query may return one or more services that best match the queries. In some instances, the service search module 130 may combine a set of two or more services responsive to at least a portion of the query in order to return a service composition. Alternatively, the service search module 130 may search one or more repositories or directories where at least one search composition is already defined. Further, the service search module 130 may dynamically determine the combination of local and remote service repositories that are to be searched by the service search module 130 based at least in part on one or more of the following: the generated search query, a subset of the metadata associated with the modeled UI, and a subset of the application context associated with the modeled UI. While illustrated as a module within IDE 110, the service search module 130 may be located external to and/or remote from the IDE 110. For example, the service search module 130 may be located with the illustrated community feedback system 180, or any other suitable location external to the IDE 110.

In some instances, the service search module 130 may return multiple responsive results to the IDE 110. To handle those instances, the service search module 130 may include a filter engine 132 operable to filter the set of responsive results according to any number of suitable criteria. The potential criteria are numerous, including whether a returned result comprises a single service or a set of services combined into a service composition. In some instances, the use of a single service may be determined to be a better result than the use of a service composition comprising multiple services, and may be provided a relatively better location within the search results and suggested services presented to the developer or user. In some instances, the search results may be filtered or ranked according to how closely the search results match the criteria associated with the modeled UI, including how close the match between a search result's inputs and outputs are with the inputs and outputs of the modeled UI. The application context information may also provide additional assistance in determining the positioning of certain search results. For example, if the application context provided information indicating that the modeled UI is associated with a retail event, then services and service compositions associated with retail-related events may be ranked relatively higher than services and service compositions associated with wholesale-related events. Still further, the user or developer associated with the modeled UI may have or be associated with a particular role within the environment 100 and/or the IDE 110. Results better associated with that role may be provided a relatively higher rating as compared to results that are not as closely associated with the role. In general, the filter engine 132 can take any number of criteria associated with the modeled UI, the application context, the developer/user, as well as others in order to provide a tailored set of results best matching the query and the query's relative context. Further, the set of results may be limited to a maximum number of matching services and/or service compositions, and also may require that the returned services and service compositions meet a minimum result threshold in order to be presented.

Once the query results are returned and filtered, the service search module 130 can present the set of search results, representing a set of suggested services and/or service compositions for the modeled UI, to the developer or user via an associated GUI, such as the client's GUI 168 (described below). As previously described, the set of suggested services and/or service compositions may be presented in a filtered or ranked order based, among other criteria, on the corresponding matches of the services with the modeled UI, application context, and the particular user. In some implementations, the service search module 130 may be associated with a portion of the IDE's 110 display, such that the search results are presented in a portion of the IDE's 110 display. Alternatively, the results provided by the service search module 130 may be displayed in one of several tabbed displays in a portion of the IDE's 110 display.

The set of suggested services and/or service compositions may be presented in one portion of the IDE's display while the modeled UI is presented in a primary portion of the display. By presenting the set of suggested services and/or service compositions concurrently with the modeled UI, the IDE 110 can illustrate how the selection of a particular one of the set of suggested services and/or service compositions may affect the modeled UI, including the addition of any required input or output fields that may need to be added to the modeled UI, as well as any suggested inputs and/or outputs that may be recommended or available in association with the selected service or service composition. In some instances, the UI integrator module 118 may perform the functionality for previewing the selection of certain services and/or service compositions. The UI integrator module 118 can analyze the particular selected service or service composition to determine if any inputs or outputs associated with the selected service or service composition are not illustrated in the modeled UI. If any inputs or outputs are not included in the modeled UI, and are required for use of the selected service or service composition, the UI integrator module 118 can create a preview of the modeled UI by presenting an amended modeled UI including UI elements associated with the required input or output. For example, if a service requires an input that is not presented, an additional text box may be added to an augmented visualization of the modeled UI to illustrate that a required input must be added if the selected service or service composition is added. Additionally, any inputs and outputs that are not required by the selected service or service composition, but that can be included and used by the selected service or composition, may also be illustrated as newly added UI elements within the augmented modeled UI. Further, if the selected service or service composition does not require an input or output already included in the modeled UI, the augmented UI may modify the UI element corresponding to that input or output to suggest that the UI element be removed if the selected service or service composition is actually selected. The UI elements representing new fields in the augmented modeled UI may be presented in different methods to indicate whether a new input or output must be added to the UI, whether a new input or output is a suggested addition to the UI, or whether an input or output is suggested to be removed from the modeled UI should the present service or service composition is selected. Until a selection of a particular service or service composition is confirmed and the service or service composition is integrated into the UI and associated application, the corresponding program code will not be modified. By focusing the selection onto another service or service composition, the modeled UI will be reaugmented such that a visualization of the effects on the modeled UI of the newly focused selection will be displayed.

Once a particular service or service composition is selected and confirmed as the final selection, the UI integrator module 118 may automatically modify the program code associated with the UI and its underlying application to reflect the new service or service composition. Alternatively, the UI integrator module 118 may allow the developer or user to choose which of the non-mandatory changes to the modeled UI should be made (i.e., selecting which suggested UI element additions and/or removals are to be performed), as well as allowing the mandatory UI elements to be modified to various types of UI elements (e.g., changing a required input from a text field to a drop-down list). Once the modifications are complete, the UI integrator module 118 finalizes the changes to the modeled UI by automatically modifying the underlying program code of the modeled UI and application to include references and calls to the selected service or service composition.

In general, the server 102 also includes memory 108 for storing data and program instructions. Memory 108 may include any memory or database module and may take the form of volatile or non-volatile memory including, without limitation, magnetic media, optical media, random access memory (RAM), read-only memory (ROM), removable media, or any other suitable local or remote memory component. Memory 108 may store various objects or data, including classes, frameworks, applications, backup data, business objects, jobs, web pages, web page templates, database tables, repositories storing services local to the server 102, and any other appropriate information including any parameters, variables, algorithms, instructions, rules, constraints, or references thereto associated with the purposes of the server 102 and its IDE 110.

As illustrated, memory 108 includes a set of stored and/or saved UIs 138, a local service repository 134, and a database storing a set of local rankings and ratings 142 associated with particular local and remote services. The set of stored UIs 138 may include any number of in-process, draft, and/or completed UIs and associated applications developed, at least in part, using the IDE 110. In some instances, the set of stored UIs 138 may temporarily store a modeled UI located external to server 102 that is currently being modified and worked on using the IDE 110. In some instances, the set of stored UIs 138 may be located external to server 102 and accessed via network 150 at runtime. Additionally, the IDE 110 may include version control tools, allowing multiple versions of a particular UI to be concurrently stored, including UIs representing augmentations associated with one or more of the suggested services and/or service compositions returned by the service search module 130 and as modified by the UI integrator module 118.

Illustrated memory 108 further includes a repository of local services 134. The repository of local services 134 may be a database storing certain services and service compositions that may be included in the IDE's 110 search for services matching modeled UIs. Alternatively, the repository 134 may be a metadata index storing information on one or more services, including references describing where the corresponding services are located, as well as information providing information on the inputs, outputs, and other information associated with a particular service. Still further, the repository of local services 134 could be any repository, directory, or index providing information and access to one or more services local to the IDE 110. One advantage of having the services local to the IDE 110 may be quicker access to services, as well as the fact that certain services may be known to the IDE 110 without needing to perform web-based or additional searching of other directories. Further, the repository of local services 134 may in some cases store or contain versions of one or more services used in and/or integrated into one or more of the set of stored UIs 138.

Illustrated memory 108 further includes a set of local ratings 142 associated with one or more local or remote services and/or service compositions. The set of local ratings 142 can represent feedback provided by one or more developers or users associated with the IDE 110 regarding one or more services or service compositions. Once a service or service composition is used in a modeled UI, the corresponding developer or user may provide a personal ranking of the service or service composition, using any number of criteria to determine the ranking, both subjective and objective. The ratings provided by a particular user or developer may be employed by the service search module 130 and filter engine 132 in order to determine the relative ranking and filtering of one or more services and/or service compositions returned in response to any service searches. The set of local ratings 142 may be updated by a user or developer explicitly providing a rating for a service or service composition, while in other instances, the local ratings may be updated based on a particular user or developer action or inaction. For example, when a particular service or service composition returned with a set of suggested services and/or service compositions is selected, the selection of that particular service or service composition may increase the ranking of the selected particular service or service composition, while decreasing the relative rating of the unselected services and/or service compositions. The set of local ratings 142 may be listed or stored as any type of values, including a range of values (e.g., 1 to 5), a star amount, or any other suitable value. In some instances, the set of local ratings 142 may include individual entries for a plurality of services and/or service compositions associated with multiple developers or users, while in other instances, the set of local ratings 142 may include one rating value for each of the plurality of services and/or service compositions included therein. In some instances, the set of local ratings 142 may be associated only with those services included in the repository of local services 134, while in other instances, the ratings may instead or also be associated with one or more remotely stored or located services and/or service compositions.

The illustrated environment of FIG. 1 also includes one or more clients 152. Each client 152 may be any computing device operable to connect to or communicate with at least the server 102 via the network 150 using a wireline or wireless connection. Further, as illustrated in FIG. 1, client 152 includes a processor 156, an interface 160, a graphical user interface (GUI) 168, a browser 164, and a memory 162. In general, client 152 comprises an electronic computer device operable to receive, transmit, process, and store any appropriate data associated with the environment 100 of FIG. 1. It will be understood that there may be any number of clients 152 associated with, or external to, environment 100. For example, while illustrated environment 100 includes one client 152, alternative implementations of environment 100 may include multiple clients communicably coupled to the server 102, or any other number of clients suitable to the purposes of the environment 100. Additionally, there may also be one or more additional clients 152 external to the illustrated portion of environment 100 that are capable of interacting with the environment 100 via the network 150. Further, the terms "client" and "user" may be used interchangeably as appropriate without departing from the scope of this disclosure. Moreover, while each client 152 is described in terms of being used by a single user, this disclosure contemplates that many users may use one computer, or that one user may use multiple computers.

The GUI 168 associated with client 152 comprises a graphical user interface operable to, for example, allow the user of client 152 to interface with at least a portion of the IDE 110 for any suitable purpose, such as creating, preparing, modifying, developing, and interacting with at least the IDE 110, as well as viewing and accessing applications under development, services and/or service compositions to be integrated into a modeled UI, and any other suitable application. Generally, the GUI 168 provides the particular user with an efficient and user-friendly presentation of business data provided by or communicated within the system. The GUI 168 may comprise a plurality of customizable frames or views having interactive fields, pull-down lists, and buttons operated by the user. For example, GUI 168 may provide interactive elements that allow a user to enter or select UI elements for designing UIs using the IDE 110 in GUI 168. The various portions of the IDE 110 may be presented and accessible to the user through GUI 168, such as through the browser 164, for example. The various UIs and applications modeled and modified by the IDE 110 may be graphically rendered by the IDE 110 and presented in GUI 168. Further, the user may modify various modeled UIs by working with the UI developer module 114 of the IDE 110, and integrating one or more services and/or service compositions into a particular modeled UI through GUI 168. More generally, GUI 168 may also provide general interactive elements that allow a user to access and utilize various services and functions of browser 164. The GUI 168 is often configurable, supports a combination of tables and graphs (bar, line, pie, status dials, etc.), and is able to build real-time portals, where tabs are delineated by key characteristics (e.g., site or micro-site). Therefore, the GUI 168 contemplates any suitable graphical user interface, such as a combination of a generic web browser, intelligent engine, and command line interface (CLI) that processes information in the platform and efficiently presents the results to the user visually.

As used in this disclosure, client 152 is intended to encompass a personal computer, touch screen terminal, workstation, network computer, kiosk, wireless data port, smart phone, personal data assistant (PDA), one or more processors within these or other devices, or any other suitable processing device. For example, each client 152 may comprise a computer that includes an input device, such as a keypad, touch screen, mouse, or other device that can accept user information, and an output device that conveys information associated with the operation of the server 102 (and IDE 110) or the client 152 itself, including digital data, visual information, the browser 164, or the GUI 168. Both the input and output device may include fixed or removable storage media such as a magnetic storage media, CD-ROM, or other suitable media, to both receive input from and provide output to users of client 152 through the display, namely, the GUI 168.

The other illustrated portions of the client 152, namely the processor 156, the interface 160, and the memory 162, may generally be similar to those described in server 102, although alternative implementations of one or more of these components may be used in some instances. For example, the interface 160 may comprise logic encoded in software and/or hardware in a suitable combination and operable to communicate with the network 150. More specifically, the interface 160 may comprise software supporting one or more communication protocols associated with communications such that the network 150 or interface's hardware is operable to communicate physical signals within and outside of the illustrated environment 100. Processor 156, while illustrated as a single processor, may be implemented as two or more processors in some instances. The processor 156 may be a central processing unit (CPU), a blade, an application specific integrated circuit (ASIC), a field-programmable gate array (FPGA), or another suitable component. Generally, the processor 156 executes instructions and manipulates data to perform the operations of client 152 and the functionality associated with the browser 164. In one implementation, the client's processor 156 executes the functionality required to generate and send requests and instructions from the client 152 to server 102, as well as the functionality required to perform the other operations of the client 152. Memory 162 may be used for storing data and program instructions, and may include any memory or database module and may take the form of volatile or non-volatile memory including, without limitation, magnetic media, optical media, random access memory (RAM), read-only memory (ROM), removable media, or any other suitable local or remote memory component.

Illustrated browser 164 may be any suitable application that may be used to access web pages, web-based applications, and all or a portion of the IDE 110. In some instances, the GUI 168 may associated with some or all of the browser 164, with the browser's corresponding use limited to interactions with the IDE 110. In particular, the browser 164 and the GUI 168 may be used to present the client-based perspective or visualization of the IDE 110, and may be used to view and navigate through and within the IDE 110. Additionally, the browser 164 may be used to view and navigate web pages located both internal and external to the server 102, some of which may be associated with the IDE 110. For purposes of the present disclosure, the GUI 168 may be a part of or the entirety of the visualization associated with the browser 164, while also merely a tool for displaying the visual representation of the client 152 and the IDE's 110 actions and interactions. In some instances, the GUI 168 and the browser 164 may be used interchangeably, particularly when the browser 164 represents a dedicated client application associated with the IDE 110.

FIG. 1 further illustrates several components existing in the set of cloud-based services and information 180. The set of cloud-based services and information 180 comprises shared resources, software, and information provided to server 102 and client 152 on-demand. In some instances, some or all of the functionality described in connection with the IDE 110 may also be implemented in or with the set of cloud-based services and information 180, such that the IDE 110 comprises a cloud-based, on-demand service. In general, the various components of the set of cloud-based services and information 180 may communicate with each other and the non-cloud-based components of environment 100 over application programming interfaces (APIs) and/or through the use of web services. In some instances, each component in the set of cloud-based services and information 180 may be considered a cloud-based application or service.

In the present disclosure, the set of cloud-based services and information 180 includes a community feedback system 182 and a cloud-based service repository 174. The cloud-based service repository 174 may be any database or repository available on the cloud storing one or more services 178 accessible to developers, users, and applications for incorporation and integration into a particular UI and/or application. As illustrated, more than one service repository 174 may be included in the set of cloud-based services and information 180. In some instances, each cloud-based service repository 174 may store or reference services associated with a particular industry, market, service type and/or functionality, service provider, and/or any other suitable division. Additionally, different service repositories 174 (or even different services 178 within a particular repository 174) may be accessible to different subsets of developers, users, and applications based on any suitable criteria or authorization scheme. For example, certain service repositories 174 may only be accessible to individuals working on development systems authenticated to be associated with a particular entity or set of entities. Alternatively, different service repositories 174 may store or reference services 178 that are compatible with different types of applications, such that only compatible applications may be able to employ the services 178 therein. Further, the cloud-based service repositories 174 may be included in some or all of the searches performed by the service search module 130 to identify and return one or more suggested services or service compositions to be potentially associated with a modeled UI in the IDE 110.

The community feedback system 182 illustrated in the set of cloud-based services and information 180 comprises a system for allowing communities of users and developers to combine their collective knowledge and experience with one or more services and/or service compositions in order to assist the service search module 130 and the filter engine 132 to identify the best set and ranking of suggested services and service compositions to return for a particular modeled UI. The community feedback system 182 may be communicably coupled (via network 150) to the IDE 110 (as well as other systems performing similar functions, including other IDEs) such that the community's ratings can be used by each developer and user when considering the services and service compositions with which to integrate into a particular modeled UI. In some instances, the community feedback system 182 may receive ratings from the IDE 110 at any point during a UI's development, including after a particular service or service composition has been integrated into a modeled UI. Additionally, the IDE 110 may also include functionality for requesting a rating or review of a selected service from developers and users after the integration has been made in order to provide additional input into the community feedback system 182. As illustrated, the community feedback system 182 includes a service ratings repository 186 for storing information associated with ratings associated with particular services and/or service compositions. In some instances, community feedback may be received from outside the IDE 110, such as through a website or web page associated with the community feedback system 182. In some instances, the community feedback system 182 may also perform operations to assist in the categorization and generation of metadata associated with a particular service or service composition, such as by collecting at least a portion of information related to the modeled UIs and corresponding application contexts in which a particular service or service composition is used. For instance, the community feedback system 182 may collect the industry, application, or other information from the application context to provide additional information as to how particular services or service compositions are used in order to provide additional information and background on various services. In some instances, developers and users may provide the information directly to the community feedback system 182, where that information can be stored with the corresponding ratings in the service ratings repository 186 and used when filtering a particular set of service search results. In some instances, the community feedback system 182 may be associated with the set of local ratings 142 such that information stored in the set of local ratings 142 is incorporated or added to the rating in the set of service ratings 186. In general, the community feedback system 182 allows large groups of developers and users to share information regarding various services and service compositions, and further, allows the IDE 110 and its various components to rank and filter results based on the community's input and ratings.

While FIG. 1 is described as containing or being associated with a plurality of elements, not all elements illustrated within environment 100 of FIG. 1 may be utilized in each alternative implementation of the present disclosure. For example, although FIG. 1 depicts a server-client environment implementing the IDE 110 at server 102 that can be accessed by client 152, in some implementations, server 102 is accessed by a developer or user working directly at the server 102 to work with the IDE 110. Further, although FIG. 1 depicts a server 102 external to network 150, servers may be included within the network 150 as part of a cloud computing network solution, for example. Additionally, one or more of the elements described herein may be located external to environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes, in addition to those purposes described herein.

Figure 2B:
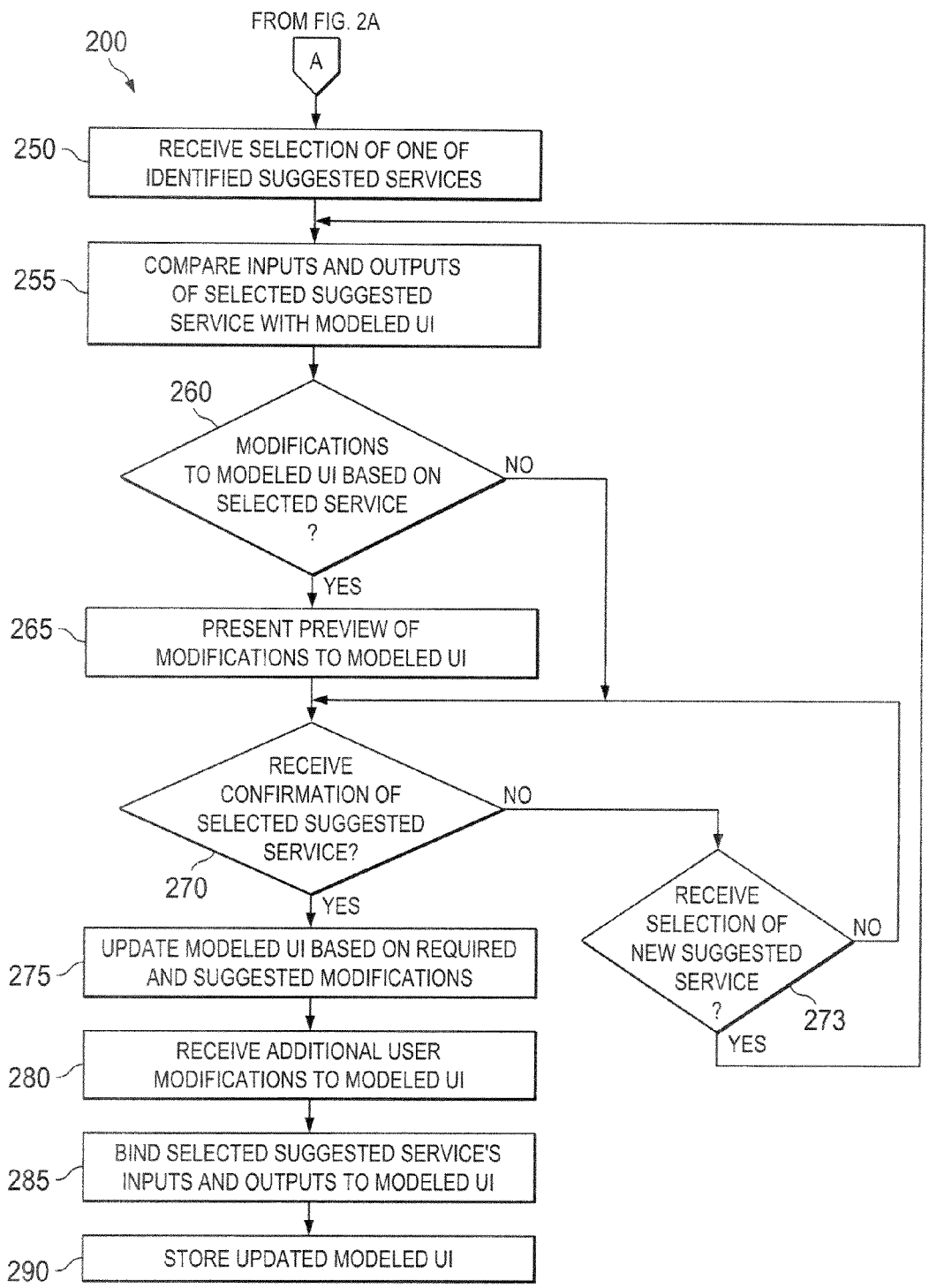

FIG. 2 is a flowchart illustrating one particular implementation of an example process 200 for automatically selecting at least one service for use and integration with a modeled UI using a suitable system as illustrated from the perspective of an IDE. For clarity of presentation, the description that follows generally describes method 200 in the context of environment 100 illustrated in FIG. 1. However, it will be understood that method 200 may be performed, for example, by any other suitable system, environment, or combination of systems and environments, as appropriate.

At 205, a modeled UI is identified or received. In some instances, a UI may be modeled by a user of the IDE to generate a UI from a template or as an original UI without a template. Alternatively, the identified modeled UI may be a stored or saved UI with inputs, outputs, and a specific UI layout already defined. The modeled UI may be identified or received from a local or remote location. Additionally, the modeled UI may be further adapted, modified, or amended before or after it is or has been identified or received.

At 210, a set of metadata associated with the modeled UI is collected. In some instances, the metadata associated with the modeled UI may include information associated with the inputs and outputs defined in the modeled UI, as well as other descriptive material provided by or retrievable from the modeled UI. In some instances, this information may include a static title or other text included in the modeled UI, including the labels provided for any UI elements associated with the inputs and outputs of the UI. In instances where the modeled UI is created using a markup language, such as HTML, XML, or any other language, the tags and information associated therewith can be collected as part of the modeled UI metadata.

At 215, a set of data representing a UI-related application context is collected. The application context of a particular modeled UI may include information associated with, but not included in, the modeled UI. For instance, the file name associated with the modeled UI may be part of the application context. Still further, any services or service compositions already associated with or related to the modeled UI can be included in the modeled UI's application context. Other examples of the information that may be collected as part of the UI's application context include the type of application associated with the modeled UI, the programming languages and technologies associated with the IDE used to develop and work with the modeled UI, the industry or area associated with the modeled UI's corresponding application, as well as any other information associated with the modeled UI.

At 220, the collected metadata and application context is parsed. In some instances, the parsing step may be automatically performed by the IDE, one of its embedded components, or an external plug-in, application, or service. In some instances, parsing the collected information may include filtering out insignificant or non-useful information, while modifying the collected information into a particular format to be used in later operations. For example, the sets of information collected may be parsed from a set of general text into an XML file, a comma-separated value (CSV) file, a database row or entry, or any other suitable format. Additionally, some of the information may be translated from the format in which it was collected to a format useable moving forward. Alternatively or additionally, some collected information may be modified, expanded, or changed based on known conversions or equivalents. For example, after the parsing step, a field named "ID" may be expanded to include the terms "ID," "identification," "user ID," and other potentially related terms or fields.

A service search query is generated at 225 after parsing the collected UI metadata and application context information. The search query may be generated in any suitable format, including a semantic query in SPARQL for execution against a semantic-type database, such as an RDF database. The service search query may be generated to access and retrieve data from one or more repositories associated with the underlying IDE. In some instances, the service search query may be generated in more than one format in order to retrieve information from various types of repositories. Additionally, two or more service search queries containing non-identical criteria may be generated based on the set of collected metadata and information, with each of the two or more queries focusing on different portions or selections of the collected data. In some instances, at least some of the two or more generated queries may include or comprise overlapping, but not identical, criteria.

At 230, at least one service repository, directory, or other storage location or index is searched using the generated service search query. In some instances, the service search query may first be executed against a local service repository or set of services. In other instances, the service search query may be concurrently executed against at least one local repository, as well as at least one external repository. In some instances, the at least one service repositories against which the service search query is executed may be determined based on at least a portion of the information collected in 210 and 215. For example, if the modeled UI is determined to be associated with the healthcare industry, the service search query may be executed against a healthcare industry-specific service repository. The IDE may perform the determination as to which service repositories are to be included in the search. The IDE may search multiple repositories after determining which service repositories to search. In some implementations, a first set of service repositories may be searched. If the number or quality of results is determined to be below a certain threshold value, a second set of service repositories may then be searched using the generated query or a variation thereof in order to obtain additional results.

At 235, at least one suggested service or service composition is identified based on the service search query results. In some instances, multiple services and/or service compositions may be identified, including services and/or service compositions identified from different repositories and locations. In some instances, particularly where a large number of results are returned from the search, a set of threshold criteria may be applied to the results to determine the quality of the results and whether specific results should be included in the set of results presented to the IDE's user. In some instances, a ranking algorithm and/or mechanism may be applied to the search results in order to identify a set of search results that will constitute the set of at least one suggested service or service compositions. Various ranking and quality-related algorithms can be applied to the search results, determining which of the identified services should be returned to the user or developer as suggested services and service compositions. Additionally, the identity of the user or developer may be used to shape the final set of suggested services and service compositions. For example, the role of the user or developer in an organization may in part determine which of the services are suggested, either based on the user/developer's level of access to particular services and/or service compositions, or based on the services or service compositions used by other users or developers in a community of developers with the same or similar roles. Still further, ratings previously provided by the user/developer for certain services and/or types of services may be used to filter and rank the search results. Still further, some implementations may limit the number of suggested services and service compositions to a specific number, such that only the relatively highest ranked search results will be returned to the user/developer.

Once the set of search results is filtered, ranked, and meets the criteria or rules defined by the IDE, at least one identified suggested service or service composition is presented to the developer or user at 240. In some implementations, the IDE may be presented in a GUI that includes, among other elements, a visualization of the modeled UI, a list of the modeled UI elements, variables, and other components, as well as a portion in which the search results and suggested services and service compositions are presented to the user/developer once the search and subsequent filtering is completed. In some instances, the suggested services and service compositions may be presented in an illustrated list presenting information associated with each suggested service or service composition, including the service's inputs, outputs, and any other information relevant to the result. Additionally, if a score or ranking was generated for a particular result, that information may also be presented concurrently with each of the suggested services. In cases where the suggested result comprises a service composition, a visualization of the combined set of services that make up the service composition may be presented. Still further, by using a mouse-over or similar gesture, additional information about the suggested services, service compositions, and/or particular services within a service composition may be presented. In some instances, the additional information may be at least a portion of the information including with the results from the service search query. Alternatively, additional information may be retrieved from the repository, directory, or other information source associated with the focused upon service or service composition.

At 250, an initial selection of one of the identified suggested services or service compositions is received. In some instances, the initial selection may comprise the selection of a radio button associated with the identified suggested service, or another similar indication within a GUI associated with the IDE that focuses or selects the service. In some instances, a mouse-over gesture or mouse-click on a particular one of the suggested services may be received to indicate the initial selection of the suggested service. Any suitable methods of selecting one of the identified suggested services or service compositions may be used in a particular implementation, including any particular method of user input including the use of a touch screen, a keyboard, a voice command, a mouse gesture, or a multi-touch gesture. Still further, in some instances the highest ranked of the set of suggested services or service compositions may automatically be initially selected at 250.

At 255, the inputs and outputs of the selected suggested service and/or service composition are compared with the inputs and outputs (and their corresponding UI elements) of the modeled UI. In some implementations, the comparison may include a semantic comparison based on the labeled inputs and outputs of the modeled UI, as well as a detailed comparison of the specific modeled UI inputs and outputs with those of the selected service or service composition when additional details or context are known with regard to the modeled UI and its underlying programming and/or UI elements. In some instances, additional inputs and/or outputs may be required by the selected service or service composition that are not included in the currently modeled UI. Alternatively, some of the inputs and outputs included in the modeled UI may not be necessary for the selected service or service composition. For example, some inputs of the modeled UI may not perform any function within the selected service or service composition. The comparison of 255 identifies these and any other differences, discrepancies, and/or issues between the modeled UI and the selected suggested service or service composition.

At 260, a determination is made as to whether mandatory and/or recommended modifications were identified during the comparison of 255. If the comparison of the selected service or service composition does not identify any mandatory and/or recommended modifications to the modeled UI, method 200 moves to 270. However, if at least one mandatory or recommended modification to the modeled UI is identified during the comparison, as well as any possible changes to the modeled UI, method 200 continues to 265. At 265, a preview of the modeled UI based on the modifications associated with the selected suggested service and/or service composition is presented. In some instances, the preview may comprise an augmented modeled UI, wherein the augmented modeled UI reflects at least one mandatory or recommended modification to the underlying modeled UI. In some instances, the augmented modeled UI may also include an indication of one or more UI elements that are not required by the selected service or service composition, and include a temporary UI element (e.g., a button superimposed over at least a portion of the associated UI element of the modeled UI) that can be used to remove the non-required UI element. For instance, a remove button may be superimposed over a "user name" input field in an augmented UI if the selected service or service composition does not have a "user name" input associated with its operations. Similarly, if an input or output is associated with the service or service composition, but is not represented in the modeled UI, the augmented UI may include an additional field for the corresponding service or service composition input or output in the augmented UI, along with a button superimposed over at least a portion of the additional field. For example, if a table is used for the output in a modeled UI, and the output of the selected service includes a "user position" field that is not included in the modeled UI, then the output table in the augmented UI may include an additional column entitled "user position," along with a superimposed add button allowing a developer or user interacting with the modeled and augmented UIs to add the field. Where a particular input or output is required by the service and is not included in the modeled UI, the augmented UI may include an automatically added UI element associated with the required service input or output. In some instances, the augmented UI may provide some indicator that the automatically added UI element is new and required, such as a visual distinction between the fields included with the modeled UI and the newly added field. In some instances, this distinction may be provided by a different type of shading of the automatically added UI element's borders, as well as any other suitable indicator.

At 270, a determination is made as to whether confirmation of the selected suggested service or service composition is confirmed. In some instances, the confirmation may be received via the execution of a selection confirmation button included within or associated with the augmented UI. Other suitable methods of allowing the developer or user to confirm the use of the selected suggested service or service composition may be presented with the augmented UI at 265. If confirmation of the selected suggested service or service composition is received, method 200 continues at 275. If no confirmation is received, method 200 continues at 273.

At 273, a determination is made as to whether a new one of the suggested services or service compositions has been selected. If no new service or service composition is selected, method 200 returns to 270 to determine if the selection of the previously selected suggested service or service composition is confirmed. If, however, a new service or service composition is selected, then method 200 returns to 255, where the newly selected service or service composition is compared to the modeled UI.

At 275, the modeled UI can be updated based on at least one of the required and/or recommended modifications as illustrated in the augmented UI presented at 265. In some instances, recommended modifications, such as those adding or removing recommended UI elements, may be indicated in the augmented UI at 265 and actually implemented in the modeled UI at 275. In other words, one or more of the temporary UI elements associated with the recommended modifications may be used by the corresponding developer or user to select the addition or deletion of particular UI elements in the augmented UI at 265. After the selected suggested service or service composition is confirmed, the modeled UI can be updated in accordance with those indications received in association with the augmented UI at 265. Additionally, any required inputs or outputs associated with the confirmed service or service composition can be added to the modeled UI at 275. Further, any additional user or developer modifications to the UI can be received at 280, allowing for additional changes to be made to the modeled UI.

At 285, the confirmed service or service composition is automatically bound to the corresponding UI elements of the modeled UI as modified in 275 and 280. In some instances, the binding operation of 285 may be initiated by an indication received from the user or developer that the modeled UI is ready for integration with the selected service or service composition. For example, the GUI associated with the IDE and the modified modeled UI may include a "finalize" or similarly labeled button that can be activated by the user or developer when modifications are complete. The IDE (and/or one of its associated or embedded components) can automatically generate the program code and associated metadata for integrating, or binding, the service or service composition into the modeled UI and the modeled UI's underlying application. In some instances, the resulting UI/service code integration may be presented within a portion of the GUI associated with the IDE. In some instances, the modifications to the program code that occurred as a result of the binding/integration may be presented in a different color, font, or format within the program code portion of the IDE in order to provide developers and users with the ability to easily visualize any code modifications. In some instances, binding the UI elements of the modeled UI with the selected service or service composition may be performed by the inherent operations of the IDE, including generating proxies associated with the selected service or service composition and incorporating the proxies into the code. Any other component, whether internal or external to the IDE, may also be used to generate and update the program code associated with the modeled UI. Once the binding and integration operations of 285 are complete, method 200 continues at 290, where the updated modeled UI is stored. The updated modeled UI may be stored locally in a UI repository associated with the IDE, or remotely in a defined or default location. In some instances, the updated modeled UI becomes the modeled UI, with the modifications to the modeled UI overwriting the previous modeled UI. Alternatively, the IDE may include versioning control, allowing the updated modeled UI to be stored as the newest version of the modeled UI, with previous versions being kept for versioning purposes.

Figure 3:
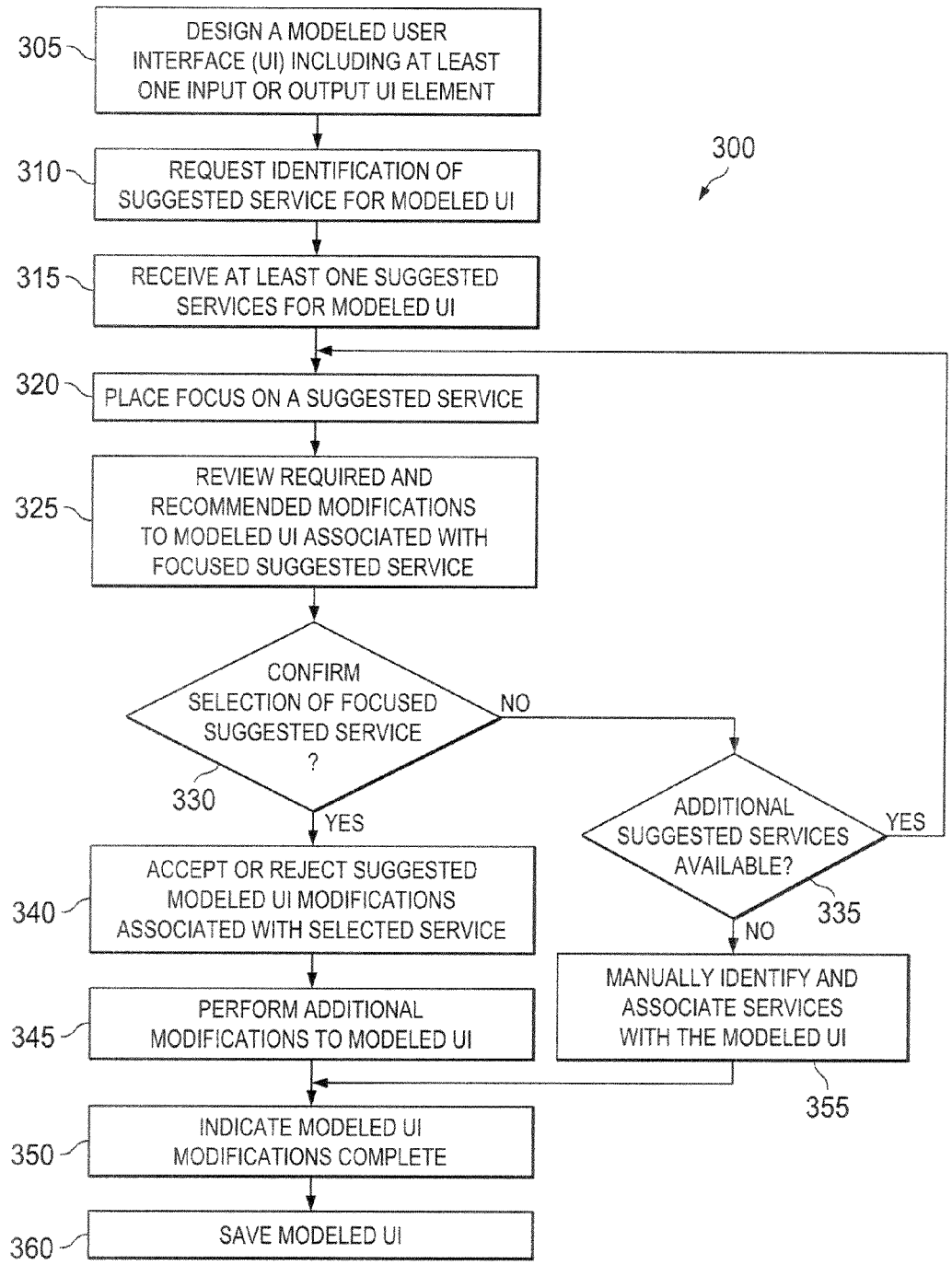
FIG. 3 is a flowchart of an example process for automatically selecting at least one service for use and integration with a modeled UI using a suitable system, such as the system described in FIG. 1, as illustrated from the perspective of a UI developer.

FIG. 3 is a flowchart of an example process 300 for automatically selecting at least one service for use and integration with a modeled UI using a suitable system as illustrated from the perspective of a UI developer. For clarity of presentation, the description that follows generally describes method 300 in the context of environment 100 illustrated in FIG. 1. However, it will be understood that method 300 may be performed, for example, by any other suitable system, environment, or combination of systems and environments, as appropriate.

At 305, the UI developer designs, develops, creates, or otherwise identifies a modeled UI. The modeled UI may be created using tools associated with or provided by an IDE. In general, the modeled UI may include at least one UI element capable of receiving at least one input and/or presenting at least one output. In some instances, the UI developer may identify a previously designed or stored modeled UI at 305, including a modeled UI created or designed by another UI developer. In some instances, the modeled UI is presented in at least a portion of a GUI associated with an IDE, through which the UI developer can modify, update, or otherwise interact with the modeled UI. Any suitable IDE may be used in association with method 300. In some instances, the GUI associated with the IDE may be presented locally at the same computing system in which the IDE is located and executed, while in other instances, the GUI may be presented remotely at a client system associated with the UI developer.

At 310, the UI developer can request the identification of at least one suggested service or service composition for the modeled UI. In some instances, a button may be provided within the GUI of the IDE that allows the UI developer to initiate the service identification operation. Alternative inputs or actions may also initiate the request.

In response to the request, at 315 the UI developer receives at least one suggested service or service composition for integration into the modeled UI at 320. In some instances, the UI developer may receive a plurality of suggested services and/or service compositions, presented via the IDE's associated GUI. The plurality of suggested services and/or service compositions can be ranked based on any suitable algorithms, and may be provided in a pre-sorted order. In some instances, the UI developer may interact with the set of suggested services and/or service compositions to change the criteria upon which the services and service compositions are ranked. In one instance, the UI developer may filter the suggested services and/or service compositions according to a cost or price to implement the suggested service or service composition, while in other instances, the UI developer may filter the services based upon the number of services included in a suggestion (e.g., a single service, two services, etc.), as well as any other suitable criteria. The set of suggested services and/or service compositions may be presented concurrently with the modeled UI, such as in separate windows or frames within the GUI of the IDE.

At 320, the UI developer can focus on one of the received suggested services. The UI developer can use any suitable method of focusing on one of the suggested services in the GUI, including mousing-over the service or service composition or by clicking on a radio button or other selection-related UI element associated with the service or service composition. In some instances, the highest ranked suggested service or service composition may be focused upon automatically when the set of suggested services and service compositions are presented to the UI developer.

At 325, the UI developer reviews the set of required and recommended modifications to the modeled UI associated with the focused suggested service. The IDE may present a modified, or augmented, UI reflecting some or all of the required and/or recommended modifications to the modeled UI as determined by the IDE. Different indicators corresponding to required modifications and recommended modifications may be illustrated with the augmented UI. For example, required modifications to UI elements within the augmented UI may be illustrated in a first format, recommended additions to the augmented UI may be illustrated in a second format, and recommended deletions of UI elements from the augmented UI may be illustrated in a third format. The various formats may include different buttons, color schemes, UI elements, or combinations thereof. Additionally, the UI elements representing recommended modifications may be interactive, such that one or more of the recommended modification may be accepted by the UI developer. Once those changes are accepted, the augmented UI may be modified to reflect the selected addition or deletion of the corresponding UI elements.

At 330, the UI developer determines whether to confirm the selection of the focused suggested service or service composition. Confirmation of the focused suggested service or service composition moves method 300 to 340. If the UI developer does not confirm the selection, method 300 continues at 335, where it is determined whether additional suggested services or service compositions are available. If additional suggested services or service compositions are available, method 300 returns to 320, where the UI developer places the focus upon a different suggested service or service composition. If no additional suggested services or service compositions are available, or the UI developer elects to end the automatic integration process, method 300 continues at 355, where the UI developer can manually identify and associate services and service compositions with the modeled UI, as well as modifying the modeled UI manually. Once those manual operations are complete, method 300 can continue at 350.

Returning to 330, if the UI developer confirms the selection of the currently focused suggested service or service composition, method 300 continues at 340. At 340, the UI developer can accept or reject any of the suggested modifications to the modeled UI associated with the confirmed selected service or service composition. In some instances, the modeled UI may incorporate any accepted or rejected modifications addressed at 325, such that only the outstanding unaddressed recommended modifications are visualized, and the previously addressed (and accepted or rejected modifications) presented as part of the modeled UI. Selections of which recommendations to accept or reject can be performed similar to the process described in and associated with 325, including the activation or selection of a button or other temporary UI element associated with the recommended modifications. In some instances, if a recommendation is not acted upon by activating the associated button or input, the recommendation will be treated as rejected. Alternatively, express rejection of a suggested modification may be available. At 345, the UI developer can perform additional modifications to the modeled UI, including changing the type of UI elements associated with the required and/or recommended modifications (e.g., by changing a text field to a combo box or other type of input or output UI element).

Once the UI developer completes the modifications to the modeled UI (whether coming from the operations of 345 or 355), the UI developer can indicate that the modifications to the modeled UI are complete at 350. In some instances, a button or other UI element may be provided within the IDE to indicate the completion, as well as one or more menu-level buttons, tabs, or shortcuts. Once the completion has been identified, the IDE performs various operations binding and integrating the modified modeled UI (and its program code) with the selected service or service composition. In some instances, the modified program code associated with the modeled UI and its application may be reviewable within the GUI of the IDE. Further, the changes performed by the IDE may be provided for review, either in a separate window or document, as well as by notes, demarcations, or indications within the illustrated program code portion of the IDE. Once the modifications are made, the UI developer can save the modeled UI and integrated code modifications at 360.

Figure 4A:
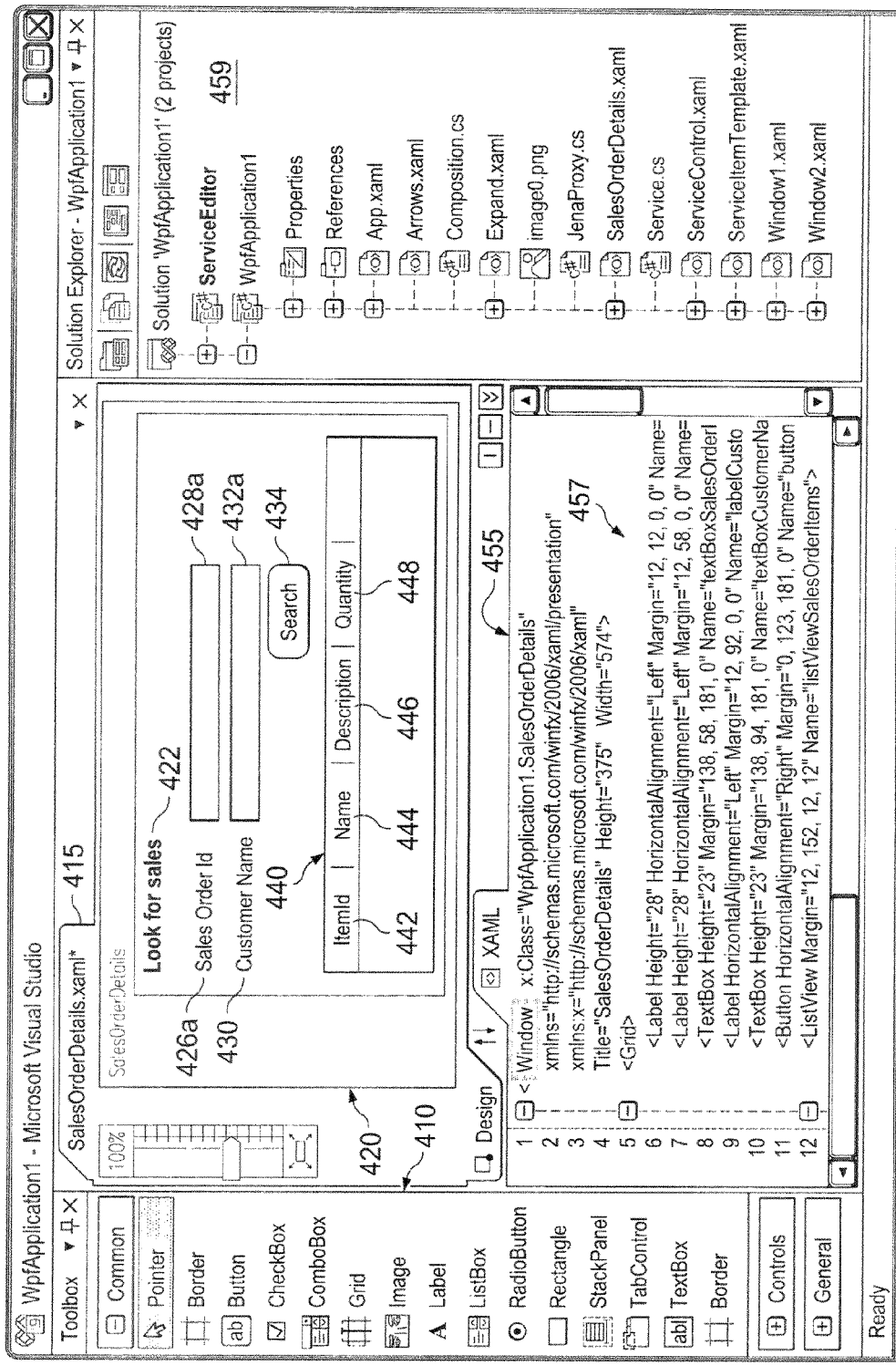
FIGS. 4A-C illustrate example screenshots associated with an IDE implementing example processes for automatically selecting at least one service for use with a modeled UI using a suitable system, such as the system described in FIG. 1.
Figure 4B:
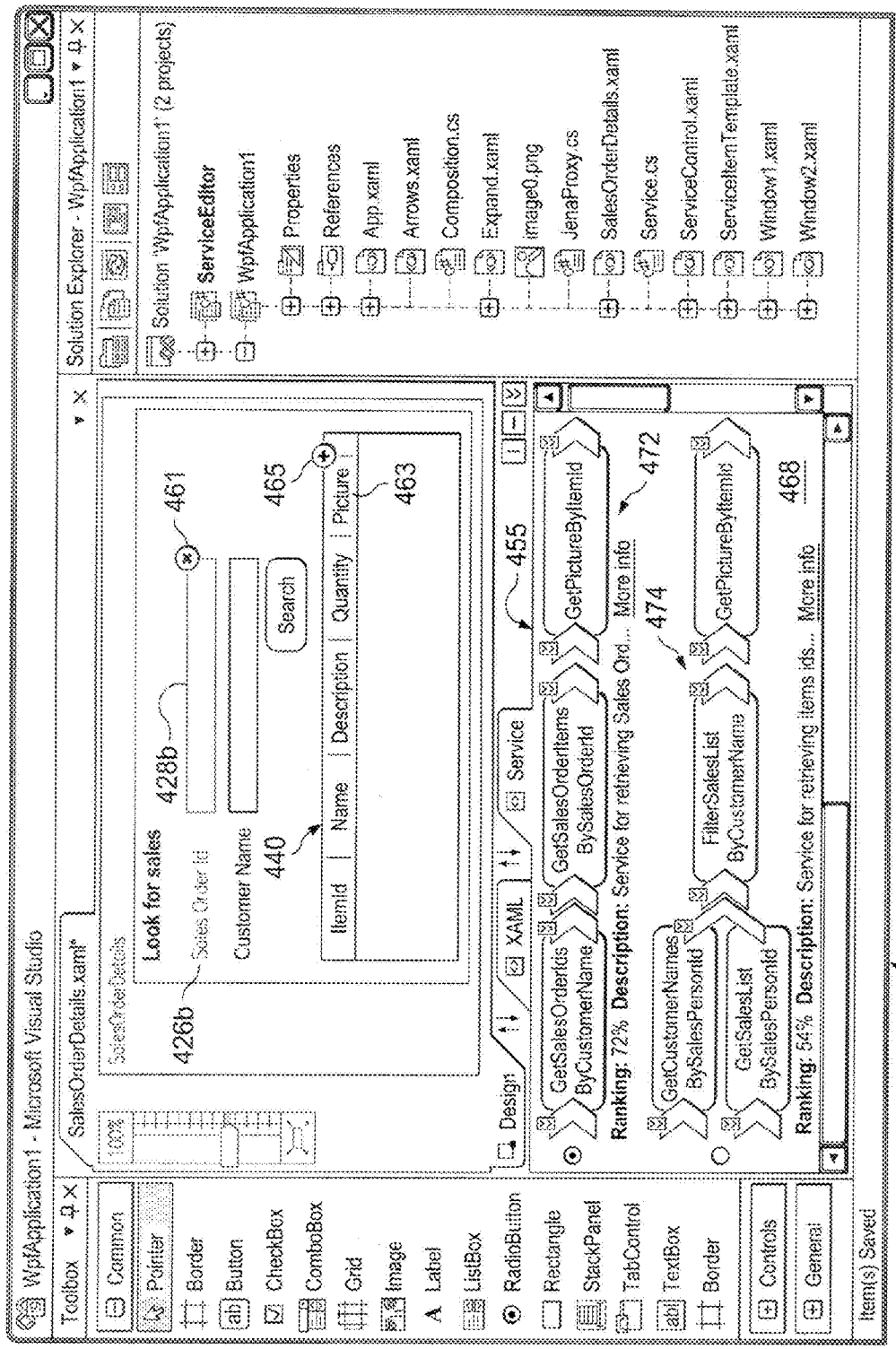
Figure 4C:
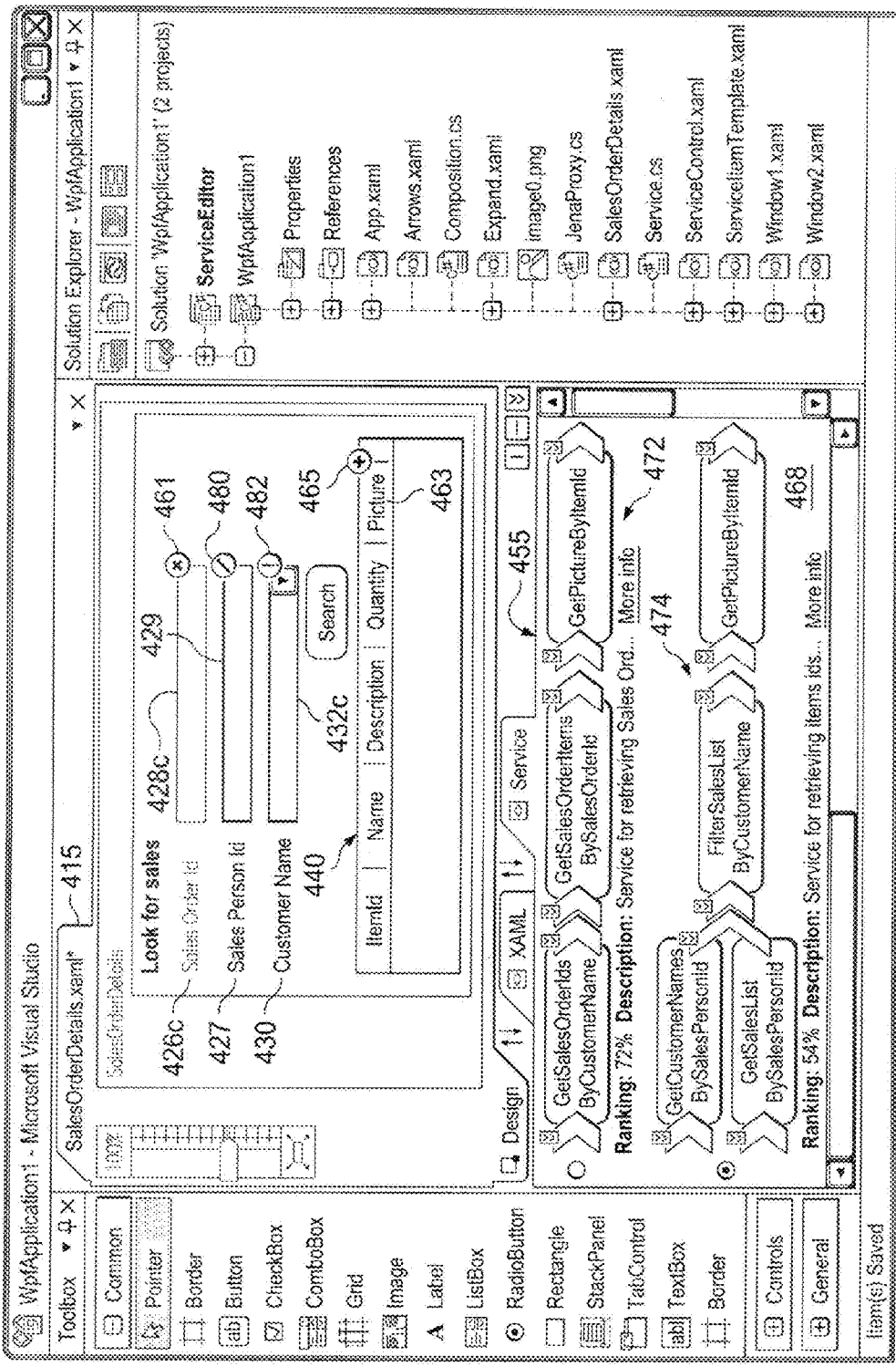

FIGS. 4A-C illustrate example screenshots of a user interface 400 associated with an IDE implementing techniques and incorporating features similar to some of those described in connection with FIGS. 1-3. As an illustrative example, and as shown in FIG. 4A, an IDE 405 presented in GUI 400 is used to generate, modify, and update one or more UIs. In FIG. 4A, a modeled UI entitled "SalesOrderDetails.xaml" 415 is shown as currently under development within the IDE 405. The modeled UI 415 is associated with the XAML, or Extensible Application Markup Language, programming language. XAML is a declarative XML-based language used to initialize structured values and objects. In other instances, the modeled UI 415 may be created using alternative markup languages, as well as other underlying programming languages.

In general, the modeled UI 415 is associated with several UI elements, including a UI area 420 encompassing the UI's title, "Look for sales" 422, several UI element labels (the UI element labels "Sales Order ID" 426*a*, "Customer Name" 430, "ItemId" 442, "Name" 444, "Description" 446, and "Quantity" 448), two input text fields 428*a* and 432*a* associated with the labels "Sales Order Id" 426*a* and "Customer Name 430", respectively, a Search button (or UI control) 434 for submitting the input values, and an output box 440 for presenting the output data, the output box 440 including the labeled columns "ItemId" 442, "Name" 444, "Description" 446, and "Quantity" 448. These UI elements may be modeled by the developer in the IDE using any UI technology.

Still further, the IDE 405 includes a window 455 presenting the current code 457 generated with or by via the IDE 405 (either automatically is association with the UI's creation or by developer or user manual coding). Although not shown, the code 457 can be automatically updated when a particular service or service composition is finally selected for integration into the modeled UI. After finalizing the selection, the code 457 may be reviewed to see the one or more changes integrating the program code associated with the selected service and/or service composition.

Sidebar 410 provides various tools for creating UIs, including a set of common UI elements (currently expanded in sidebar 410) as well as a set of controls (currently collapsed in sidebar 410). In some instances, the developer may drag-and-drop UI elements from the sidebar 410 into the portion of the window representing the current project (here, 415) and also move UI elements to specific locations within the modeled UI. Window 459 provides a listing of applications, forms, properties, projects, UIs, stylesheets, source code, and other items related to the modeled UI. The items in window 459 may be used as at least a portion of an application context associated with the modeled UI. Additional items, including the modeled UI's file name and the application's name, may also be included as part of the application context, including developer-specific information.

Once the developer is satisfied with the visual layout of the modeled UI, the developer can request a set of services and/or service compositions for use and integration with the modeled UI. FIG. 4B illustrates the IDE 405 after at least two services and/or compositions have been returned in the IDE 405. As illustrated, a new tab in window 455 is provided to present the search results 468 of the requested service search. In general, the search results 468 presented in window 455 represent one or more services and/or service compositions returned based on a service search query associated with the modeled UI. As illustrated in FIG. 4B, the top two results associated with the modeled UI are two service compositions 472, 474 representing a combination of several individual services. The individual services associated with each service composition, as well as a ranking and description, are provided with each search result. The ranking of the results can be based on any number of factors, including those specific to the developer, as well as to the application associated with the UI. Different factors can be weighted differently, allowing the results to be customized. In some instances, the ranking can be modified by allowing the developer to define or apply different levels of importance to various subsets of criteria, such as the cost to use the associated service or service composition, and the speed of the service or service composition, as well as any other relevant criteria.

As illustrated in FIG. 4B, each search result is associated with a radio button. Alternative methods of selecting or focusing on a particular search result may be included in other implementations and examples. In this example, the developer has selected the first search result 472. When the search result is selected, the modeled UI 415 is augmented based on one or more suggested modifications to the modeled UI based on the inputs and outputs associated with the selected search result 472. As illustrated in FIG. 4B, the selected search result combines three services, "GetSalesOrderIdsByCustomerName," "GetSalesOrderItemsBySalesOrderId," and "GetPictureByItemId." In other words, the first service retrieves a sales order ID using a Customer Name, and the second service obtains one or more sales order items using the retrieved sales order ID from the first service. The third service is an additional service for providing additional information based on the first two services—namely, a picture associated with an item ID from a specific sales order items that is provided by the output from the second service. Returning to the previously modeled UI, the UI labels and associated inputs were "Sales Order ID" 426 (associated with input field 428 and "Customer Name" 430 (associated with input field 432). Because the service composition does not need the sales order ID to perform its operations, the IDE 405 augments the modeled UI to suggest that the Sales Order ID label 426b and input field 428b be removed, as illustrated by temporary UI element 461. Temporary UI element 461 is illustrated as a button with an "X", indicating the recommendation of removing the corresponding input field from the UI. In this case, the removal is recommended because the Sales Order ID is not an input associated with the selected service composition. Additionally, a new output column labeled Picture 463 is included in the output box 440, representing the output of the GetPictureByItemID as provided by the service composition. This new output column is overlaid by the temporary UI element 465, illustrated as a button with a "+" sign, indicating the recommended addition of the output column based on the available output of the selected service composition. If the developer agrees with the suggested modifications, the developer can click on or otherwise activate the corresponding temporary UI element (461 or 465) in order to modify the modeled UI. Once selected, the modeled UI can reflect the modifications, and the code 457 illustrated in FIG. 4A can be modified based on the updated UI fields and/or elements. Although not illustrated in FIGS. 4A-C, once the selection of a particular service or service composition is finalized, the program code associated with the particular service or service composition is integrated into the program code 457 associated with the modeled UI. Developers and other users can view the updated program code within the IDE 405, and in some cases, may be able to view the updated program code with the code modifications listed, highlighted, or otherwise presented to differentiate from the original program code.

FIG. 4C illustrates the IDE 405 after the second service composition 474 is selected among the search results 468 (previously illustrated in FIG. 4B), along with the corresponding suggested and required modifications that selection would cause to the modeled UI. As the search results 468 presented in window 455 show, the second service composition includes four combined services: a "GetCustomerNamesBySalesPersonId" service, a "GetSalesListBySalesSalesPersonID" service, a "FilterSalesListByCustomerName" service, and a "GetPictureByItemId" service. Because none of the individual services include an input for Sales Order ID, the augmented UI indicates a suggested removal of the Sales Order ID input by providing a temporary UI element 461 for removing the input and label as illustrated in FIG. 4B. Further, the input of Sales Person ID is a required input in the service composition, as both of the initial services are based on the input of a Sales Person ID. Therefore, FIG. 4C illustrates the addition of a Sales Person ID label 427 and a Sales Person ID text field 429. Additionally, the temporary UI element 480, represented by a "/" sign, illustrates that the Sales Person ID input is required, and cannot be modified if the selected service composition is selected. FIG. 4C also includes a modification of the Customer Name input from the previously included text field into a combo box UI element 432C. This modification is suggested in order to employ the "FilterSalesListByCustomerName" service, and can be associated with and/or populated with one or more filter criteria that may be associated with the Customer Name, including a set of ascending or descending options for sorting the list, as well as other options or filter criteria that can be used to filter out at least a portion of the Sales Lists returned by the "GetSalesListBySalesSalesPersonID" service. The temporary UI element 482, represented as a UI element with a "!" sign, notifies the developer that the suggested combo box element 432c, while associated with a previous UI input within the modeled UI, has been modified from one UI control (i.e., a text field) into a different UI control (i.e., a combo box). In some instances, the change from one UI control to another may be optional, and thus may provide the developer with an option or suggestion to change the UI control accordingly. For example, if the UI control modification was optional in the present illustration, and the modification was not accepted by the developer, then the Customer Name text box 432a of FIG. 4A would remain even if search result 474 is selected. Finally, the IDE 405 of FIG. 4C recommends the addition of the output column labeled Picture 463 in output box 440 using the temporary UI element 465.

The preceding figures and accompanying description illustrate example processes and computer implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously, concurrently, and/or in different orders than as shown. Moreover, environment 100 may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A method, comprising:
    identifying, at design time in an integrated development environment (IDE), a modeled user interface (UI) associated with an application;
    collecting a set of information associated with the identified modeled UI;
    parsing, by operation of at least one computer, the collected set of information to create parsed model data;

searching at least one service repository for a set of services to associate with the modeled UI using an automatically generated and executed service search query based on the parsed model data;

presenting at least a portion of a received set of services generated in response to the executed service search query;

receiving a selection of at least one service of the presented portion;

determining at least one difference between a set of inputs and outputs for the selected at least one service and a set of input and output UI elements included in the modeled UI;

presenting, based on the determined at least one difference, at least one determined modification to the modeled UI within a generated augmented version of the modeled UI, wherein generating the augmented version of the modeled UI comprises:

updating the modeled UI as the augmented version of the modeled UI, the augmented version of the modeled UI including the at least one determined modification to the modeled UI; and presenting the augmented version of the modeled UI using a graphical user interface (GUI) associated with the IDE; and automatically modifying the modeled UI according to the at least one determined modification.

2. The method of claim 1, wherein collecting the set of information associated with the modeled UI comprises:

analyzing the modeled UI for metadata associated with at least one UI element included in the modeled UI; and collecting a set of information comprising an application context associated with the modeled UI.

3. The method of claim 2, wherein the service search query is based at least in part on a combination of the metadata associated with the at least one UI element included in the modeled UI and the application context associated with the modeled UI.

4. The method of claim 2, wherein the application context includes one or more of the following: information on a project associated with the modeled UI, information associated with an application associated with the modeled UI, information associated with an industry associated with the modeled UI, information associated with a developer of the modeled UI, and a name of the modeled UI.

5. The method of claim 2, wherein the metadata associated with the at least one UI element includes a label of at least one UI element, a UI element type associated with the at least one UI element, at least one input included within the modeled UI, and at least one output included within the modeled UI.

6. The method of claim 1, wherein searching at least one service repository for the set of services associated with the modeled UI further comprises automatically determining the at least one service repository based on the generated search service query.

7. The method of claim 6, wherein searching the at least one service repository for the set of services associated with the modeled UI further comprises:

identifying a set of services responsive to the generated service search query from the determined at least one service repository; and ranking each service of the identified set of services based on at least one criteria associated with the modeled UI.

8. The method of claim 7, wherein the at least a portion of the set of services is presented using a GUI associated with the IDE as a predefined number of the identified set of services in descending order based on a relative ranking of each service.

9. The method of claim 7, wherein the ranking of each service of the identified set of services incorporates at least a portion of a community-based ranking associated with each service.

10. The method of claim 6, wherein the generated service search query comprises a semantic-based search query and the at least one determined service repository comprises a resource description framework (RDF) database.

11. The method of claim 1, wherein each service comprises a single service or a combination of two or more services.

12. The method of claim 1, further comprising receiving a selection confirmation for the presented at least one determined modification.

13. A computer program product encoded on a tangible, non-transitory storage medium, the product comprising computer readable instructions for causing one or more processors to perform operations comprising:

identifying, at design time in an integrated development environment (IDE), a modeled user interface (UI) associated with an application;

collecting a set of information associated with the identified modeled UI;

parsing the collected set of information to create parsed model data;

searching at least one service repository for a set of services to associate with the modeled UI using an automatically generated and executed service search query based on the parsed model data;

presenting at least a portion of a received set of services generated in response to the executed service search query;

receiving a selection of at least one service of the presented portion;

determining at least one difference between a set of inputs and outputs for the selected at least one service and a set of input and output UI elements included in the modeled UI;

presenting, based on the determined at least one difference, at least one determined modification to the modeled UI within a generated augmented version of the modeled UI, wherein generating the augmented version of the modeled UI comprises:

updating the modeled UI as the augmented version of the modeled UI, the augmented version of the modeled UI including the at least one determined modification to the modeled UI; and presenting the augmented version of the modeled UI using a graphical user interface (GUI) associated with the IDE; and automatically modifying the modeled UI according to the at least one determined modification.

14. The computer program product of claim 13, wherein collecting the set of information associated with the modeled UI comprises:

analyzing the modeled UI for metadata associated with at least one UI element included in the modeled UI; and collecting a set of information comprising an application context associated with the modeled UI.

15. The computer program product of claim 14, wherein the service search query is based at least in part on a combination of the metadata associated with the at least one UI element included in the modeled UI and the application context associated with the modeled UI.

16. The computer program product of claim 14, wherein searching at least one service repository for the set of services associated with the modeled UI further comprises automatically determining at least one service repository based on the generated service search query.

17. The computer program product of claim 16, wherein searching at least one service repository for at least one suggested service associated with the modeled UI further comprises:
  identifying a set of services responsive to the generated service search query from the determined at least one service repository; and
  ranking each service of the identified set of services based on at least one criteria associated with the modeled UI.

18. The computer program product of claim 17, wherein the ranking of each service of the identified set of services incorporates at least a portion of a community-based ranking associated with each service.

19. The computer program product of claim 13, the computer program product further comprising instructions for receiving a selection confirmation for the presented at least one determined modification.

20. A system comprising:
  a memory operable to store at least one service repository comprising a plurality of services and information associated with each of the plurality of services, each service operable to perform at least one operation associated with user interface (UI) elements within a modeled UI; and
  a processor communicatively coupled to the memory and operable to:
    identify, at design time in an integrated development environment (IDE), a modeled user interface (UI) associated with an application;
    collect a set of information associated with the identified modeled UI;
    parse the collected set of information to create parsed model data;
    search the at least one service repository for a set of services to associate with the modeled UI using an automatically generated and executed service search query based on the parsed model data;
    present at least a portion of a received set of services generated in response to the executed service search query;
    receive a selection of at least one service of the presented portion;
    determine at least one difference between a set of inputs and outputs for the selected at least one service and a set of input and output UI elements included in the modeled UI;
    present, based on the determined at least one difference, at least one determined modification to the modeled UI within a generated augmented version of the modeled UI, wherein generating the augmented version of the modeled UI comprises:
      update the modeled UI as the augmented version of the modeled UI, the augmented version of the modeled UI including the at least one determined modification to the modeled UI; and
      present the augmented version of the modeled UI using a graphical user interface (GUI) associated with the IDE; and
    automatically modify the modeled UI according to the at least one determined modification.

21. The system of claim 20, the memory comprising at least one local memory storing at least one local service repository and at least one remote memory storing at least one remote service repository, wherein searching at least one of the stored service repositories for the set of services comprises searching the at least one local service repository and the at least one remote service repository.

22. The system of claim 21, wherein at least a portion of the at least one remote memory comprises a cloud-based storage, and further wherein at least one of the remote service repositories comprises a cloud-based service repository.

* * * * *